US012717779B1

(12) United States Patent
Houdbert et al.

(10) Patent No.: US 12,717,779 B1
(45) Date of Patent: Aug. 25, 2026

(54) SYSTEM, METHOD, AND COMPUTER PROGRAM PRODUCT FOR AUTOMATICALLY GENERATING A STRUCTURED DOCUMENT BASED ON A PLURALITY OF DATA SOURCES

(71) Applicant: Mistral AI, Paris (FR)

(72) Inventors: Aurélien Houdbert, Paris (FR); Alan Chauchet, Paris (FR); Geoffroy d'Autichamp, Paris (FR); Alodie Boissonnet, Paris (FR)

(73) Assignee: Mistral AI, Paris (FR)

( * ) Notice: Subject to any disclaimer, the term of this patent is extended or adjusted under 35 U.S.C. 154(b) by 0 days.

(21) Appl. No.: 19/419,714

(22) Filed: Dec. 15, 2025

(51) Int. Cl.
*G06F 16/20* (2019.01)
*G06F 16/242* (2019.01)
*G06F 16/2457* (2019.01)

(52) U.S. Cl.
CPC ...... *G06F 16/243* (2019.01); *G06F 16/24578* (2019.01)

(58) Field of Classification Search
CPC ......................... G06F 16/243; G06F 16/24578
See application file for complete search history.

(56) References Cited

U.S. PATENT DOCUMENTS

| | | | | |
|---|---|---|---|---|
| 10,331,681 | B1 * | 6/2019 | Chen | G06F 16/285 |
| 12,536,449 | B1 * | 1/2026 | Cui | G06F 16/3329 |
| 2020/0126136 | A1 * | 4/2020 | Rajbhoj | G06F 40/30 |
| 2024/0152535 | A1 * | 5/2024 | Zacharia | G06F 40/30 |

* cited by examiner

*Primary Examiner* — Kristopher Andersen
(74) *Attorney, Agent, or Firm* — The Webb Law Firm

(57) ABSTRACT

Provided are systems, methods, and computer program products for generating a structured document. The system includes a computing device configured to extract a plurality of information prompts from a document, display, in an interactive graphical user interface, the plurality of information prompts and at least one selectable option configured to modify the plurality of information prompts, verify the plurality of information prompts, in response to verifying the plurality of information prompts, automatically retrieve a plurality of data elements corresponding to the plurality of information prompts from a plurality of different data sources, generate at least one inference request based on the plurality of information prompts and the plurality of data elements, and generate a structured document based on processing the at least one inference request with at least one machine-learning model.

50 Claims, 10 Drawing Sheets

700

30 questions extracted.

Please review your questions and submit to generate the answers

Question 1

Company Name

Question 2

Contact Person

Question 3

Phone

Question 4

Email

Question 5

Website

FIG. 9
Company Name
800
The company name is Company A. Company A is a leader in manufacturing and is headquartered in Paris, France.
1 Sources
Contact Person
For Company A, the primary contact is the Account Manager that can be reached at m@companya.com. For general inquiries...
3 Sources
Phone
Translation
Export

Sources

Source 1 – Customer relationship and account management

Source 2 – Group Cybersecurity

Source 3 – Company information

Sharepoint

Area: Organization

Topic: Org chart

Please refer to the latest org chart available in the company presentation here.

SYSTEM, METHOD, AND COMPUTER PROGRAM PRODUCT FOR AUTOMATICALLY GENERATING A STRUCTURED DOCUMENT BASED ON A PLURALITY OF DATA SOURCES

BACKGROUND

1. Field

This disclosure relates generally to machine-learning and, in some non-limiting embodiments or aspects, systems, methods, and computer program products for automatically generating a structured document based on a plurality of data sources.

2. Technical Considerations

Modern Retrieval-Augmented Generation (RAG) systems rely on a retrieval step to obtain relevant documents to use as contextual input for a generative artificial intelligence model, such as a Large Language Model (LLM), to generate an output. The overall effectiveness and accuracy of the LLM output is dependent on how accurate this retrieval step is. In the context of responding to prompts for information, such as Requests for Proposal (RFPs) and/or Requests for Information (RFIs), the retrieval process can be of a highly varied nature: some prompts for information are general and conceptual, while others demand factual precision on technical terms, acronyms, product names, or specific figures. Existing retrieval approaches, based on a single method, exhibit technical limitations when applied to a varied set of prompts for information spanning multiple domains of information and/or expertise.

Further, using an LLM to generate a structured response to prompts for information, such as RFPs or RFIs, may utilize a large amount of computational resources because the process may need to be repeated to correct errors and inaccurate information that arise due to differences in the structure of input documents containing the prompts for information, the wording of the prompts for information, and/or the context of the responses.

The use of artificial intelligence, such as machine-learning models, to generate structured responses to prompts for information, such as RFPs or RFIs, may require accuracy and validation in corporate and other like environments. Such validation may involve multiple entities, such as individuals, teams, departments, and/or the like, that involve manual and separate communications without an ability to accurately track or manage responses. Finalization of a structured response document may be delayed and the structured response document may need to be revised or generated again due to an inability to internally communicate with and/or identify the appropriate entities, particularly when prompts for information span multiple informational domains.

SUMMARY

According to non-limiting embodiments or aspects, provided is a method comprising: extracting, with at least one processor, a plurality of information prompts from a document; displaying, in an interactive graphical user interface, the plurality of information prompts and at least one selectable option configured to modify the plurality of information prompts; verifying the plurality of information prompts; in response to verifying the plurality of information prompts, automatically retrieving a plurality of data elements corresponding to the plurality of information prompts from a plurality of different data sources, each data element of the plurality of data elements corresponding to at least one information prompt of the plurality of information prompts; generating, with at least one processor, at least one inference request based on the plurality of information prompts and the plurality of data elements; and generating, with at least one processor, a structured document based on processing the at least one inference request with at least one machine-learning model.

In non-limiting embodiments or aspects, wherein automatically retrieving the plurality of data elements corresponding to the plurality of information prompts comprises: for each information prompt of the plurality of information prompts: conduct a semantic search of the plurality of data sources; conduct a lexical search of the plurality of data sources; merge an output of the semantic search with an output of the lexical search to generate a merged ranking of data sources or data elements; retrieve at least one data element from at least one data source based on the merged ranking. In non-limiting embodiments or aspects, the at least one inference request comprises a plurality of inference requests, and wherein generating the at least one inference request based on the plurality of information prompts and the plurality of data elements comprises: generating an inference request for each information prompt of the plurality of information prompts, each inference request comprising the at least one data element retrieved based on the information prompt. In non-limiting embodiments or aspects, conducting the lexical search comprises: querying the plurality of data sources with a first search query based on a sequence of tokens in each information prompt, resulting in a first search output; querying the plurality of data sources with a second search query based on individual tokens in each information prompt, resulting in a second search output; and combining the first search output and the second search output to form the output of the lexical search.

In non-limiting embodiments or aspects, combining the first search output and the second search output comprises: generating a lexical score for each search result in the first search output and the second search output by: generating a first relevance score based on a first weight and the first search output; generating a second relevance score based on a second weight and the second search output; generating a boost score based on the first search output; and combining the first relevance score, the second relevance score, and the boost score. In non-limiting embodiments or aspects, the method includes: generating a second interactive graphical user interface based on at least one output received from processing the at least one inference request with the at least one machine-learning model, the second interactive graphical user interface comprising a plurality of responses to the plurality of information prompts and at least one feedback option configured to receive user input associated with at least one response of the plurality of responses; and updating at least one of the machine-learning model and a search algorithm configured to automatically retrieve the plurality of data elements based on the user input associated with the at least one response of the plurality of responses.

In non-limiting embodiments or aspects, the at least one feedback option comprises: a first feedback option configured to receive a selection of a predefined feedback response from at least two feedback responses, and a second feedback option configured to receive a freeform response from a user, the structured document is generated based on at least one of a predefined feedback response and the freeform response.

In non-limiting embodiments or aspects, the method includes automatically updating language translations of a response of the plurality of responses based on the freeform response. In non-limiting embodiments or aspects, the second interactive graphical user interface comprises a plurality of source objects, each source object based on a data element of the plurality of data elements, each source object comprising at least a portion of the data element and at least one of the following: metadata associated with a data source including the data element, a classification of the data element, a classification of a data source including the data element, or any combination thereof.

In non-limiting embodiments or aspects, verifying the plurality of information prompts comprises: determining a classification of at least one information prompt of the plurality of information prompts; determining a verification source from a plurality of verification sources based on the classification; automatically routing the at least one information prompt to the verification source; and receiving, from the verification source, a verification of the at least one information prompt. In non-limiting embodiments or aspects, the method includes: receiving a plurality of responses to the plurality of information prompts based on processing the at least one inference request with the at least one machine-learning model; determining a classification of at least one information prompt of the plurality of information prompts; determining a validation source from a plurality of validation sources for the at least one information prompt based on the classification; and automatically routing a response to the at least one information prompt from the plurality of responses to the validation source. In non-limiting embodiments or aspects, the method includes: displaying a second interactive graphical user interface to a validation source, the second interactive graphical user interface configured to receive a modification of the response; receiving the modification from the validation source through the second interactive graphical user interface; and replacing the response with the modification in the structured response. In non-limiting embodiments or aspects, the method includes generating a final structured response based on receiving validation responses from all validation sources that received a routed response.

According to non-limiting embodiments or aspects, provided is a system comprising: at least one computing device configured to: extract a plurality of information prompts from a document; display, in an interactive graphical user interface, the plurality of information prompts and at least one selectable option configured to modify the plurality of information prompts; verify the plurality of information prompts; in response to verifying the plurality of information prompts, automatically retrieve a plurality of data elements corresponding to the plurality of information prompts from a plurality of different data sources, each data element of the plurality of data elements corresponding to at least one information prompt of the plurality of information prompts; generate at least one inference request based on the plurality of information prompts and the plurality of data elements; and generate a structured document based on processing the at least one inference request with at least one machine-learning model.

In non-limiting embodiments or aspects, wherein automatically retrieving the plurality of data elements corresponding to the plurality of information prompts comprises: for each information prompt of the plurality of information prompts: conduct a semantic search of the plurality of data sources; conduct a lexical search of the plurality of data sources; merge an output of the semantic search with an output of the lexical search to generate a merged ranking of data sources or data elements; retrieve at least one data element from at least one data source based on the merged ranking. In non-limiting embodiments or aspects, the at least one inference request comprises a plurality of inference requests, and wherein generating the at least one inference request based on the plurality of information prompts and the plurality of data elements comprises: generating an inference request for each information prompt of the plurality of information prompts, each inference request comprising the at least one data element retrieved based on the information prompt. In non-limiting embodiments or aspects, wherein conducting the lexical search comprises: querying the plurality of data sources with a first search query based on a sequence of tokens in each information prompt, resulting in a first search output; querying the plurality of data sources with a second search query based on individual tokens in each information prompt, resulting in a second search output; and combining the first search output and the second search output to form the output of the lexical search.

In non-limiting embodiments or aspects, wherein combining the first search output and the second search output comprises: generating a lexical score for each search result in the first search output and the second search output by: generating a first relevance score based on a first weight and the first search output; generating a second relevance score based on a second weight and the second search output; generating a boost score based on the first search output; and combining the first relevance score, the second relevance score, and the boost score. In non-limiting embodiments or aspects, the computing device further configured to: generate a second interactive graphical user interface based on at least one output received from processing the at least one inference request with the at least one machine-learning model, the second interactive graphical user interface comprising a plurality of responses to the plurality of information prompts and at least one feedback option configured to receive user input associated with at least one response of the plurality of responses; and update at least one of the machine-learning model and a search algorithm configured to automatically retrieve the plurality of data elements based on the user input associated with the at least one response of the plurality of responses. In non-limiting embodiments or aspects, the at least one feedback option comprises: a first feedback option configured to receive a selection of a predefined feedback response from at least two feedback responses, and a second feedback option configured to receive a freeform response from a user, the structured document is generated based on at least one of a predefined feedback response and the freeform response.

In non-limiting embodiments or aspects, the computing device further configured to: automatically update language translations of a response of the plurality of responses based on the freeform response. In non-limiting embodiments or aspects, the second interactive graphical user interface comprises a plurality of source objects, each source object based on a data element of the plurality of data elements, each source object comprising at least a portion of the data element and at least one of the following: metadata associated with a data source including the data element, a classification of the data element, a classification of a data source including the data element, or any combination thereof. In non-limiting embodiments or aspects, wherein verifying the plurality of information prompts comprises: determining a classification of at least one information prompt of the plurality of information prompts; determining a verification source from a plurality of verification sources based on the classification; automatically routing the at least one information prompt to the verification source; and receiving, from the verification source, a verification of the at least one information prompt.

In non-limiting embodiments or aspects, the computing device further configured to: receive a plurality of responses to the plurality of information prompts based on processing the at least one inference request with the at least one machine-learning model; determine a classification of at least one information prompt of the plurality of information prompts; determine a validation source from a plurality of validation sources for the at least one information prompt based on the classification; and automatically route a response to the at least one information prompt from the plurality of responses to the validation source. In non-limiting embodiments or aspects, computing device further configured to: display a second interactive graphical user interface to a validation source, the second interactive graphical user interface configured to receive a modification of the response; receive the modification from the validation source through the second interactive graphical user interface; and replace the response with the modification in the structured response. In non-limiting embodiments or aspects, computing device further configured to: generate a final structured response based on receiving validation responses from all validation sources that received a routed response.

According to non-limiting embodiments or aspects, provided is a computer program product comprising at least one non-transitory computer-readable medium including program instructions that, when executed by at least one processor, cause the at least one processor to: extract a plurality of information prompts from a document; display, in an interactive graphical user interface, the plurality of information prompts and at least one selectable option configured to modify the plurality of information prompts; verify the plurality of information prompts; in response to verifying the plurality of information prompts, automatically retrieve a plurality of data elements corresponding to the plurality of information prompts from a plurality of different data sources, each data element of the plurality of data elements corresponding to at least one information prompt of the plurality of information prompts; generate at least one inference request based on the plurality of information prompts and the plurality of data elements; and generate a structured document based on processing the at least one inference request with at least one machine-learning model.

Further non-limiting embodiments and aspects are provided in the following clauses:

Clause 1: A method comprising: extracting, with at least one processor, a plurality of information prompts from a document; displaying, in an interactive graphical user interface, the plurality of information prompts and at least one selectable option configured to modify the plurality of information prompts; verifying the plurality of information prompts; in response to verifying the plurality of information prompts, automatically retrieving a plurality of data elements corresponding to the plurality of information prompts from a plurality of different data sources, each data element of the plurality of data elements corresponding to at least one information prompt of the plurality of information prompts; generating, with at least one processor, at least one inference request based on the plurality of information prompts and the plurality of data elements; and generating, with at least one processor, a structured document based on processing the at least one inference request with at least one machine-learning model.

Clause 2: The method of clause 1, wherein automatically retrieving the plurality of data elements corresponding to the plurality of information prompts comprises: for each information prompt of the plurality of information prompts: conduct a semantic search of the plurality of data sources; conduct a lexical search of the plurality of data sources; merge an output of the semantic search with an output of the lexical search to generate a merged ranking of data sources or data elements; retrieve at least one data element from at least one data source based on the merged ranking.

Clause 3: The method of any of clauses 1-2, wherein the at least one inference request comprises a plurality of inference requests, and wherein generating the at least one inference request based on the plurality of information prompts and the plurality of data elements comprises: generating an inference request for each information prompt of the plurality of information prompts, each inference request comprising the at least one data element retrieved based on the information prompt.

Clause 4: The method of any of clauses 1-3, wherein conducting the lexical search comprises: querying the plurality of data sources with a first search query based on a sequence of tokens in each information prompt, resulting in a first search output; querying the plurality of data sources with a second search query based on individual tokens in each information prompt, resulting in a second search output; and combining the first search output and the second search output to form the output of the lexical search.

Clause 5: The method of any of clauses 1-4, wherein combining the first search output and the second search output comprises: generating a lexical score for each search result in the first search output and the second search output by: generating a first relevance score based on a first weight and the first search output; generating a second relevance score based on a second weight and the second search output; generating a boost score based on the first search output; and combining the first relevance score, the second relevance score, and the boost score.

Clause 6: The method of any of clauses 1-5, further comprising: generating a second interactive graphical user interface based on at least one output received from processing the at least one inference request with the at least one machine-learning model, the second interactive graphical user interface comprising a plurality of responses to the plurality of information prompts and at least one feedback option configured to receive user input associated with at least one response of the plurality of responses; and updating at least one of the machine-learning model and a search algorithm configured to automatically retrieve the plurality of data elements based on the user input associated with the at least one response of the plurality of responses.

Clause 7: The method of any of clauses 1-6, wherein the at least one feedback option comprises: a first feedback option configured to receive a selection of a predefined feedback response from at least two feedback responses, and a second feedback option configured to receive a freeform response from a user, wherein the structured document is generated based on at least one of a predefined feedback response and the freeform response.

Clause 8: The method of any of clauses 1-7, further comprising: automatically updating language translations of a response of the plurality of responses based on the freeform response.

Clause 9: The method of any of clauses 1-8, wherein the second interactive graphical user interface comprises a plurality of source objects, each source object based on a data element of the plurality of data elements, each source object comprising at least a portion of the data element and at least one of the following: metadata associated with a data source including the data element, a classification of the data element, a classification of a data source including the data element, or any combination thereof.

Clause 10: The method of any of clauses 1-9, wherein verifying the plurality of information prompts comprises: determining a classification of at least one information prompt of the plurality of information prompts; determining a verification source from a plurality of verification sources based on the classification; automatically routing the at least one information prompt to the verification source; and receiving, from the verification source, a verification of the at least one information prompt.

Clause 11: The method of any of clauses 1-10, further comprising: receiving a plurality of responses to the plurality of information prompts based on processing the at least one inference request with the at least one machine-learning model; determining a classification of at least one information prompt of the plurality of information prompts; determining a validation source from a plurality of validation sources for the at least one information prompt based on the classification; and automatically routing a response to the at least one information prompt from the plurality of responses to the validation source.

Clause 12: The method of any of clauses 1-11, further comprising: displaying a second interactive graphical user interface to a validation source, the second interactive graphical user interface configured to receive a modification of the response; receiving the modification from the validation source through the second interactive graphical user interface; and replacing the response with the modification in the structured response.

Clause 13: The method of any of clauses 1-12, further comprising: generating a final structured response based on receiving validation responses from all validation sources that received a routed response.

Clause 14: A system comprising: at least one computing device configured to: extract a plurality of information prompts from a document; display, in an interactive graphical user interface, the plurality of information prompts and at least one selectable option configured to modify the plurality of information prompts; verify the plurality of information prompts; in response to verifying the plurality of information prompts, automatically retrieve a plurality of data elements corresponding to the plurality of information prompts from a plurality of different data sources, each data element of the plurality of data elements corresponding to at least one information prompt of the plurality of information prompts; generate at least one inference request based on the plurality of information prompts and the plurality of data elements; and generate a structured document based on processing the at least one inference request with at least one machine-learning model.

Clause 15: The system of clause 14, wherein automatically retrieving the plurality of data elements corresponding to the plurality of information prompts comprises: for each information prompt of the plurality of information prompts: conduct a semantic search of the plurality of data sources; conduct a lexical search of the plurality of data sources; merge an output of the semantic search with an output of the lexical search to generate a merged ranking of data sources or data elements; retrieve at least one data element from at least one data source based on the merged ranking.

Clause 16: The system of any of clauses 14-15, wherein the at least one inference request comprises a plurality of inference requests, and wherein generating the at least one inference request based on the plurality of information prompts and the plurality of data elements comprises: generating an inference request for each information prompt of the plurality of information prompts, each inference request comprising the at least one data element retrieved based on the information prompt.

Clause 17: The system of any of clauses 14-16, wherein conducting the lexical search comprises: querying the plurality of data sources with a first search query based on a sequence of tokens in each information prompt, resulting in a first search output; querying the plurality of data sources with a second search query based on individual tokens in each information prompt, resulting in a second search output; and combining the first search output and the second search output to form the output of the lexical search.

Clause 18: The system of any of clauses 14-17, wherein combining the first search output and the second search output comprises: generating a lexical score for each search result in the first search output and the second search output by: generating a first relevance score based on a first weight and the first search output; generating a second relevance score based on a second weight and the second search output; generating a boost score based on the first search output; and combining the first relevance score, the second relevance score, and the boost score.

Clause 19: The system of any of clauses 14-18, the computing device further configured to: generate a second interactive graphical user interface based on at least one output received from processing the at least one inference request with the at least one machine-learning model, the second interactive graphical user interface comprising a plurality of responses to the plurality of information prompts and at least one feedback option configured to receive user input associated with at least one response of the plurality of responses; and update at least one of the machine-learning model and a search algorithm configured to automatically retrieve the plurality of data elements based on the user input associated with the at least one response of the plurality of responses.

Clause 20: The system of any of clauses 14-19, wherein the at least one feedback option comprises: a first feedback option configured to receive a selection of a predefined feedback response from at least two feedback responses, and a second feedback option configured to receive a freeform response from a user, wherein the structured document is generated based on at least one of a predefined feedback response and the freeform response.

Clause 21: The system of any of clauses 14-20, the computing device further configured to: automatically update language translations of a response of the plurality of responses based on the freeform response.

Clause 22: The system of any of clauses 14-21, wherein the second interactive graphical user interface comprises a plurality of source objects, each source object based on a data element of the plurality of data elements, each source object comprising at least a portion of the data element and at least one of the following: metadata associated with a data source including the data element, a classification of the data element, a classification of a data source including the data element, or any combination thereof.

Clause 23: The system of any of clauses 14-22, wherein verifying the plurality of information prompts comprises:

determining a classification of at least one information prompt of the plurality of information prompts; determining a verification source from a plurality of verification sources based on the classification; automatically routing the at least one information prompt to the verification source; and receiving, from the verification source, a verification of the at least one information prompt.

Clause 24: The system of any of clauses 14-23, the computing device further configured to: receive a plurality of responses to the plurality of information prompts based on processing the at least one inference request with the at least one machine-learning model; determine a classification of at least one information prompt of the plurality of information prompts; determine a validation source from a plurality of validation sources for the at least one information prompt based on the classification; and automatically route a response to the at least one information prompt from the plurality of responses to the validation source.

Clause 25: The system of any of clauses 14-24, the computing device further configured to: display a second interactive graphical user interface to a validation source, the second interactive graphical user interface configured to receive a modification of the response; receive the modification from the validation source through the second interactive graphical user interface; and replace the response with the modification in the structured response.

Clause 26: The system of any of clauses 14-25, the computing device further configured to: generate a final structured response based on receiving validation responses from all validation sources that received a routed response.

Clause 27: A computer program product comprising at least one non-transitory computer-readable medium including program instructions that, when executed by at least one processor, cause the at least one processor to: extract a plurality of information prompts from a document; display, in an interactive graphical user interface, the plurality of information prompts and at least one selectable option configured to modify the plurality of information prompts; verify the plurality of information prompts; in response to verifying the plurality of information prompts, automatically retrieve a plurality of data elements corresponding to the plurality of information prompts from a plurality of different data sources, each data element of the plurality of data elements corresponding to at least one information prompt of the plurality of information prompts; generate at least one inference request based on the plurality of information prompts and the plurality of data elements; and generate a structured document based on processing the at least one inference request with at least one machine-learning model.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying schematic figures, in which:

FIG. 10 illustrates a metadata GUI according to non-limiting embodiments or aspects.

DESCRIPTION

Figure 1:
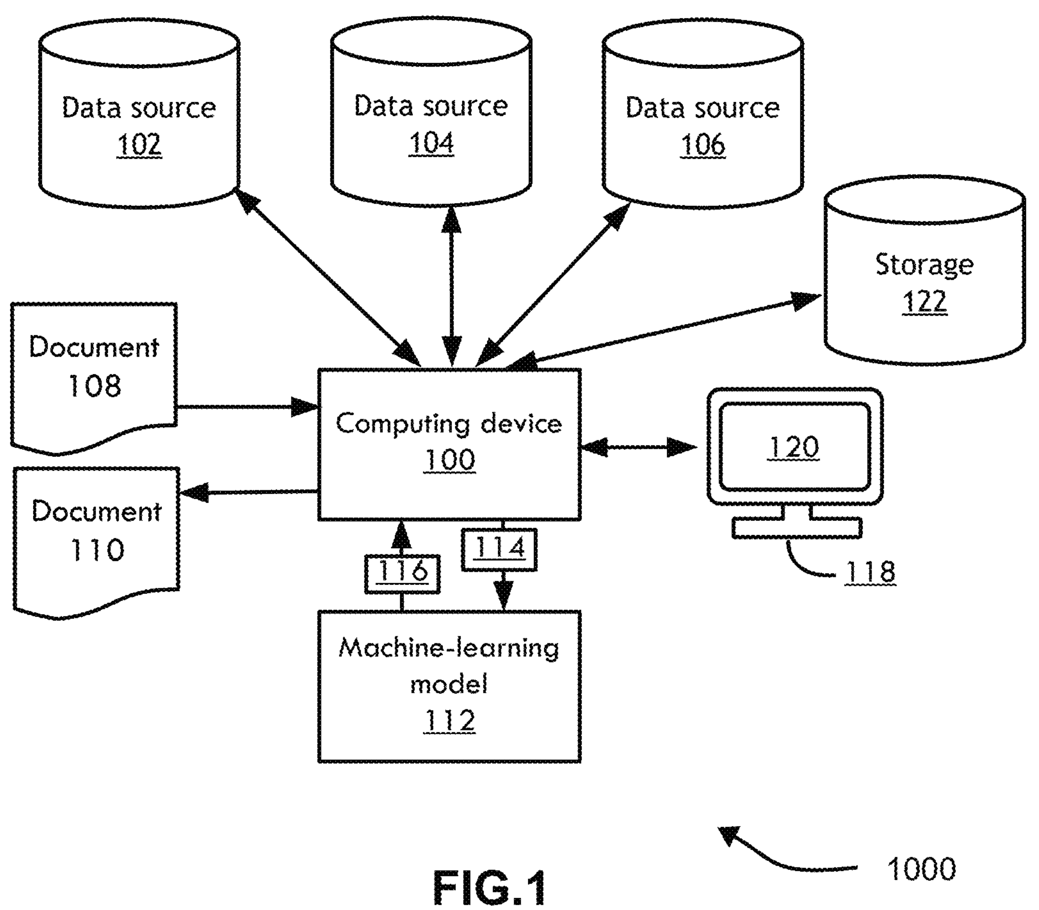
FIG. 1 illustrates a schematic diagram of a system for automatically generating a structured document based on a plurality of data sources according to non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "computing device" may refer to one or more devices configured to process data. A computing device may include one or more processors, such as Central Processing Units (CPUs), Graphics Processing Units (GPUs), microcontrollers, integrated circuits, field-programmable gate arrays (FPGAs), and/or the like. A computing device may, in some examples, include components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer, server, or other form of non-mobile computer. In some non-limiting embodiments, a computing device may include a biological or quantum processing device.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, mobile devices, etc.) directly or indirectly communicating in the network environment may constitute a "system." Reference to "a server" or "a processor," as used herein, may refer to a previously recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Provided herein are systems, methods, and computer program products for automatically generating a structured response document based on a plurality of data sources that improve upon existing processes, such as retrieval-augmented generation (RAG) processes. Non-limiting embodiments cause such processes to be more computationally efficient and produce more accurate results. For example, through merging multiple separate ranked search results generated with different search protocols, non-limiting embodiments provide for an efficient use of computational resources by limiting the amount of contextual input data used to prompt a Large Language Model (LLM) or another machine-learning model. This improves the performance of LLMs and other machine-learning models, particularly for tasks that use varying types of information from different informational domains for individual tasks in a comprehensive workflow.

Moreover, non-limiting embodiments provide for a dynamic workflow for generating a structured document responsive to prompts for information that reduces the use of computational resources that would otherwise be expended. By using an automated workflow combined with validation and/or verification at predetermined parts of the workflow, non-limiting embodiments can dynamically adapt to changes in the internal infrastructure, systems, personnel, and/or the like within an organization without requiring new models or altered processes. Non-limiting embodiments also provide for a unique structure for user feedback, including multiple feedback options of different types, creating a feedback loop that operates as an active, self-healing process to execute the workflow efficiently. Non-limiting embodiments leverage user interactions with predetermined aspects of the workflow to improve the current real-time workflow execution and to improve future workflows. Other benefits and advantages will be realized by those skilled in the art.

Referring now to FIG. 1, a system 1000 for automatically generating a structured document based on a plurality of data sources is shown according to non-limiting embodiments. The system 1000 includes a computing device 100 configured to execute one or more software applications. The computing device 100 may be in communication with multiple data sources 102, 104, 106 that may be local and/or remote to the computing device 100. For example, one or more of data sources 102, 104, 106 may be a data storage device local to the computing device 100, a data storage device local to the client computing device 118, or a data storage device hosted by a remote server and in communication with the computing device 100 via one or more Application Programming Interfaces (APIs) or the like. In some non-limiting embodiments, the data sources 102, 104, 106 may be physically and/or logically separated memory maintained by an entity, such as an organization. For example, the different data sources 102, 104, 106 may be different data storage devices or different folders or files within a single data storage device. In some non-limiting embodiments, the data sources 102, 104, 106 may include different data based on a category of the data, an internal department or group within an organization, a physical location, a custody of the data, and/or the like. Various other arrangements of local and remote data storage are possible.

Figures 6, 7:
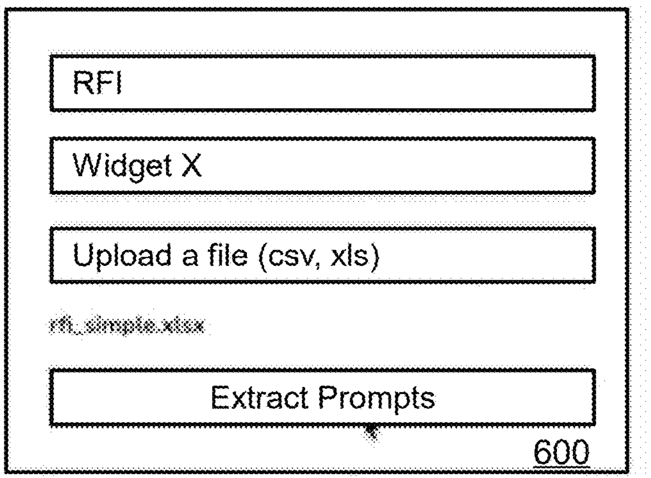
FIG. 6 illustrates a request graphical user interface (GUI) according to non-limiting embodiments or aspects.
FIGS. 7 and 8 illustrate a verification GUI according to non-limiting embodiments or aspects.

With continued reference to FIG. 1, a document 108 may be received by the computing device 100. The document 108 may include several different prompts for information. As used herein, a "prompt for information" refers to a human-readable request or question seeking a response. For example, the document 108 may be a Request for Production (RFP), Request for Information (RFI), questionnaire, or other like document that prompts for multiple different responses that correspond to multiple different informational domains and/or data sources (e.g., data sources 102, 104, 106). The document 108 may be uploaded to the computing device 100 by a user of a client computing device 118, as an example, or may be copied and pasted as text and/or downloaded or retrieved by the computing device 100. The client computing device 118 may be in communication with the computing device 100 via a network connection and may display a GUI 120 configured to facilitate a user to select, identify, and/or upload the document 108. An example request GUI 600 is shown in FIG. 6 as a non-limiting embodiment.

Once the document 108 is received by the computing device 100, the document 108 may be automatically parsed by the computing device 100 to identify and extract a plurality of prompts for information contained in the document 108. Each prompt for information may be extracted individually from the document 108 and stored as a string, for example, in a data structure such as an array in the internal memory of computing device 100 or in any other location. The prompts for information may be extracted with one or more models and/or rules configured to identify prompts for information within the document 108 based on, for example, formatting, numbering, lettering, words, semantic matches with predefined keywords, lexical matches with predefined keywords, and/or the like. In some non-limiting embodiments, an LLM (such as machine-learning model 112) may be used to extract the prompts for information.

Figure 8:
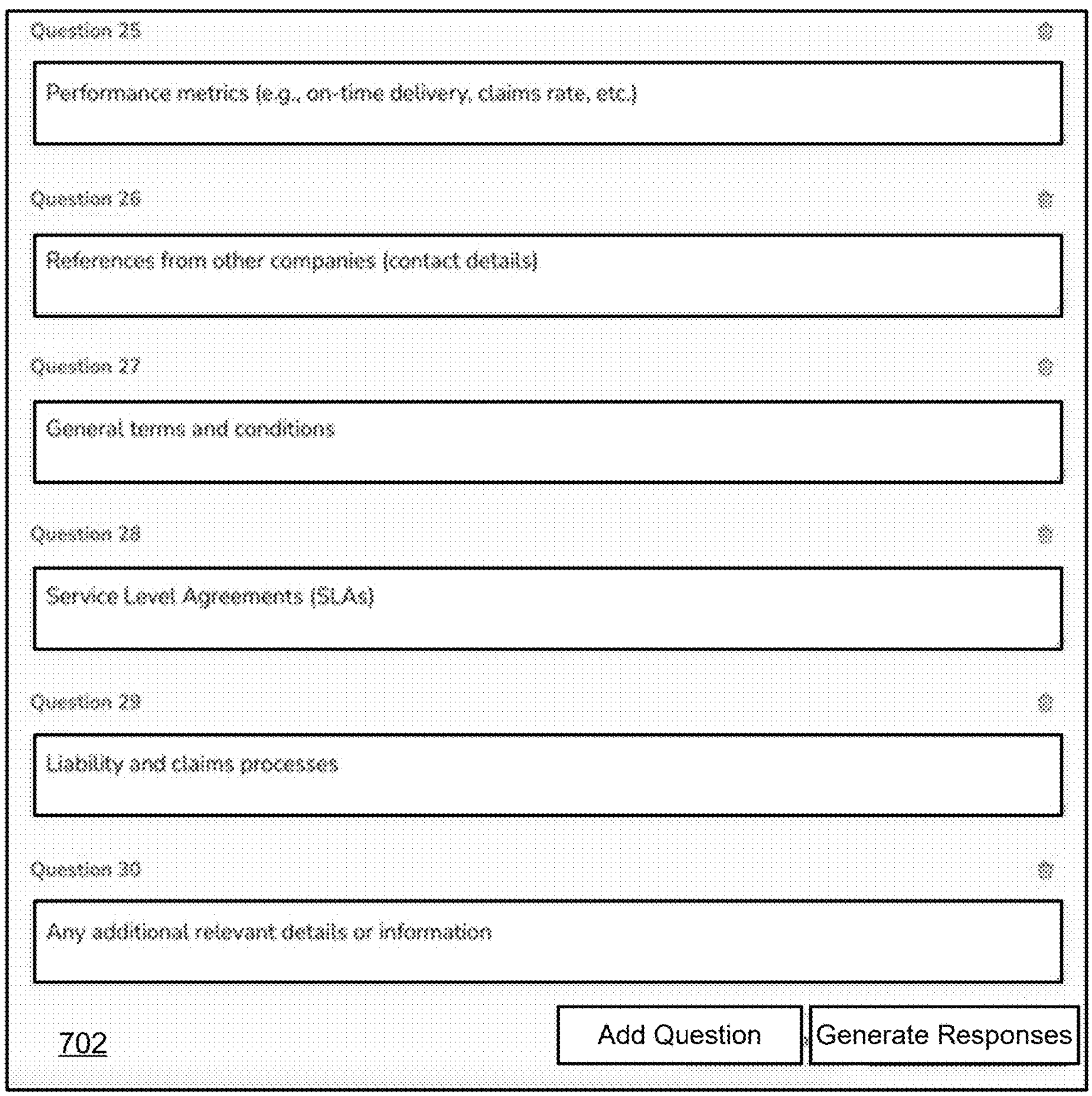

Still referring to FIG. 1, the extracted prompts for information may be verified by an automated verification process, such as an artificial intelligence agent or an interaction by a user. For example, the extracted prompts for information may be separately displayed on a GUI 120 of a client computing device 118. An example verification GUI 700, 702 is shown in FIG. 7 and FIG. 8 as a non-limiting embodiment. The GUI 120 may include selectable options to facilitate a user to verify one or more prompts for information and/or modify one or more prompts for information. Selectable options on the GUI 120 may include options to edit a prompt for information (e.g., to correct phrasing, typographical errors, incorrect extractions, and/or the like), delete a prompt for information (e.g., remove prompts that are duplicates or are not relevant), and add prompts for information that may have been missed during extraction and/or that may have been incorrectly combined with another extracted prompt. The GUI 120 may also include a selectable option to verify one or all the extracted prompts for information, such as a "Generate Responses" button. In response to verifying the prompts for information, a retrieval process may be automatically initiated to retrieve documents or portions thereof to be used as context in generating the responses to the prompts for information. In non-limiting embodiments, verification of all extracted prompts for information may automatically trigger the retrieval process. However, it will be appreciated that individual retrieval processes may be automatically initiated in response to one or more prompts for information being verified and before all prompts for information are verified.

With continued reference to FIG. 1, in response to the prompts for information being verified, the computing device may automatically initiate a retrieval process to retrieve a plurality of data elements from the different data sources 102, 104, 106. For example, the computing device 100 may separately search the data sources 102, 104, 106 for each prompt for information. As used herein, the term "data element" refers to data representing at least a portion of a document, image, file, and/or the like. For example, a data element may include an entire textual document, a portion (e.g., chunk, such as a sentence, paragraph, page, chapter, and/or the like) of a textual document, an image file, a video file, an audio file, and/or any other data including information in any format. The data element(s) for each prompt for information may be stored in memory of the computing device 100 or in any other location.

In non-limiting embodiments, the computing device 100 may generate one or more inference requests 114 to prompt the machine-learning model 112 to return an output, such as a response to a prompt for information. As used herein, an "inference request" refers to a message that causes generation of an output by a machine-learning model 112. For example, an inference request may include a prompt command for a machine-learning model that identifies a requested output, such as a textual response to a prompt for information, and may include one or more data elements as input for the machine-learning model 112 to use as context in generating an output. The machine-learning model 112 may be an LLM in non-limiting embodiments. Although one machine-learning model 112 is shown in FIG. 1, it will be appreciated that, in some non-limiting embodiments, multiple LLMs and/or versions of LLMs may be used.

Still referring to FIG. 1, in some non-limiting embodiments, an inference request 114 may be separately generated for each prompt for information and may be separately input into a machine-learning model 112 in series or in parallel. Multiple outputs 116 may be received and stored in memory of the computing device 100. In other non-limiting embodiments, an inference request 114 may be generated for all or a subset of prompts for information such that the machine-learning model 112 is instructed to generate responses to multiple prompts for information as part of one output 116. It will be appreciated that the inference request(s) 114 and output(s) 116 may be orchestrated by the computing device 100 in various ways.

In non-limiting embodiments in which multiple separate outputs 116 are received by the computing device 100 for the plurality of prompts for information, the computing device 100 may generate a structured response document 110 including responses to each prompt for information. The structured response document 110 may include, for example, a modified version of document 108 with responses inserted adjacent each prompt for information or a new document that formatted according to one or more rules differing from document 108. In non-limiting embodiments, the structured response document 110 may include a text document, a word processing document file, a spreadsheet file, an image file, a webpage, structured text within a GUI 120 window that can be copied, and/or the like. In non-limiting embodiments, the computing device 100 may assemble the outputs 116 based on one or more rules and/or templates. In some examples, a machine-learning model (such as model 112 or another model) may be prompted with the aggregated individual responses (e.g., aggregated outputs 116 or responses derived therefrom) to generate the structured response document 110. In non-limiting embodiments in which the output 116 of the machine-learning model 112 includes a complete structured document, the computing device 100 may or may not format and/or modify the structured document before outputting the structured response document 110.

Figure 9:
FIG. 9 illustrates a validation GUI according to non-limiting embodiments or aspects.

With continued reference to FIG. 1, in non-limiting embodiments, before the final structured response document 110 is output (e.g., to the client computing device 118 or the like), the output(s) 116 and/or structured response document 110 may be displayed on a GUI 120 of the client computing device 118 for the responses to be validated. An example validation GUI 800 is shown in FIG. 9 as a non-limiting embodiment. For example, a GUI 120 may include one or more selectable options to validate, reject, and/or modify each individual response to each prompt for information. In non-limiting embodiments, the output(s) 116 and/or structured response document 110 may be displayed on a GUI 120 with structured, contextual metadata for one or more responses. The contextual metadata may include, for example, values for parameters representing a source of the data element retrieved for the response, a topic of the data element or source of the data element, a category of the data element or source of the data element, and/or the like. Such metadata may be identified and stored when indexing the various data sources 102, 104, 106, when searching the data sources, and/or the like. In non-limiting embodiments, a data structure that stores the response in association with the prompt for information may also include parameter fields (e.g., columns in an embedding table or other data structure) for each response and/or data element used to generate the response, including document name, page identifier, sheet name, section identifier, topic, category, and/or the like. As an example, a data element may be identified with a source document (e.g., "Cybersecurity Policy", "Employee Handbook", and/or the like), a category (e.g., "data protection", "personnel", "manufacturing", "pricing", and/or the like), a topic and/or subcategory (e.g., "physical security controls", "hiring practices", "assembly line details", "facility location", and/or the like), and the content of data element (e.g., the text of the document chunk, image, and/or the like). In non-limiting embodiments, citation markers (e.g., "[1]", "[2]", or numbered superscripts) may be inserted directly into the response generated for a prompt for information, such that each citation marker corresponds to one or more metadata parameters. The citation markers may include links that display the corresponding metadata upon selection of the link, allowing the user to seamlessly navigate from a specific portion of the response to the exact evidence that supports the response.

Figure 10:
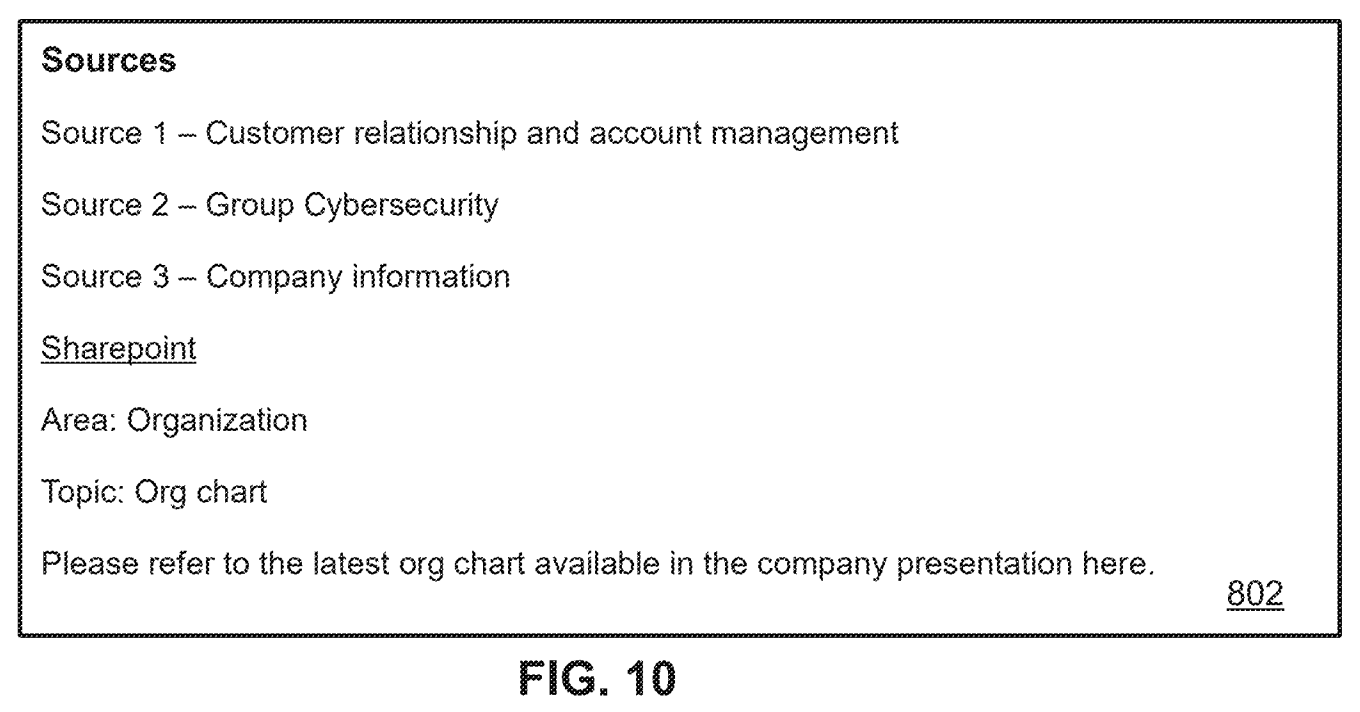

In non-limiting embodiments, the GUI 120 of the client computing device 118 may display the contextual metadata adjacent the corresponding response to a prompt for information or as a separate window or GUI that is displayed upon interaction with the GUI 120. For example, the metadata may be displayed as one or more separate boxes or other like structures on the GUI 120 that may be expanded upon selection or other user interaction. The displayed metadata may include an identification of the document, which may include a title, identifier, and/or preview of a multi-page document, a single page document (e.g., a sheet), a page or sheet within a multi-page document, and/or the like. An example metadata GUI 802 is shown in FIG. 10 as a non-limiting embodiment.

In non-limiting embodiments, two or more forms of user feedback may be used for validation and/or correction. For example, category-based feedback may be provided as a first feedback option and may include two or more selections to categorize a response to a prompt for information. The category-based feedback option may be binary, such as "validate" or "reject" (e.g., thumbs up or thumbs down, like or dislike, and/or the like). Freeform feedback may be provided as a second feedback option and may include a text box and/or text editing interface configured to receive explanatory user feedback, such as a modification of the response, an explanation as to why the response is incorrect or inaccurate, an explanation as to what would make the response correct or accurate, and/or the like. Both forms of feedback may be used in non-limiting embodiments to capture and leverage both a sentiment signal and a structured correction. The multiple forms of user input may be stored as separate fields in a data structure, as an example, and used to regenerate one or more responses, train a machine-learning model (e.g., model 112), update one or more rules or templates, and/or the like.

In non-limiting embodiments, in response to a corrected (e.g., modified or new) response being input by the user as feedback for a particular prompt for information and corresponding response, the response may be automatically generated again (e.g., including generating a new inference request for machine-learning model 112) and/or replaced with the user input without regenerating. In some non-limiting embodiments, the correct response may automatically trigger a generation and/or replacement of all existing translations for the corresponding response so that each translation reflects the user-provided correction.

In non-limiting embodiments, the first feedback option (e.g., category-based feedback, such as a binary approval or rejection) may be used to validate a response or automatically trigger the generation of a new response when there is not any usable feedback provided through the second feedback option. In addition to user feedback being used in real-time (e.g., during the initial processing workflow to generate a structured document), the feedback may also be stored and used at a later time to train and/or finetune one or more machine-learning models (e.g., model 112).

With continued reference to FIG. 1, in non-limiting embodiments, structured response documents may be stored for multiple requests to generate RFPs, RFIs, questionnaires, or the like over time in a data storage device 122 in communication with or local to the computing device 100. The structured response documents may be stored in association with contextual metadata for each response generated, including the data element(s) used to generate the response and any user feedback received. In non-limiting embodiments, a GUI (e.g., GUI 120) may be generated and displayed on a client computing device 118 to facilitate user queries related to the stored structure response documents. In non-limiting embodiments, such a GUI may present a multi-criteria filter tool to allow a user to construct and/or control the query. At least one filter may include a metadata filter configured to search and filter the stored structured response documents in storage 122 based on the context of the query, such as a date range, the name of the request, and/or a product or service category, as examples. At least one other filter may include an answer quality filter configured to search and filter the stored structure response documents based on feedback indicating the user-perceived quality of the generated response. For example, feedback may include a binary indication of positive or negative, a modified or new response, and/or the like, and may be used to construct a query of the stored structured response documents. In non-limiting embodiments, a database query may be automatically constructed based on both metadata filter(s) and quality-based inputs.

In non-limiting embodiments, a GUI may be generated and displayed in response to the multi-criteria query including, for example, a list of all the individual structured response documents and/or input documents from which the structured response documents were generated, and corresponding prompts for information that match the criteria. In non-limiting embodiments, a set of summary statistics calculated on the filtered dataset may be provided in an aggregated, visual format. For example, if the user filters for "product: Widget X" and "answer quality: negative feedback," the GUI may display the total count and percentage of negatively rated answers for that specific product.

Figure 2:
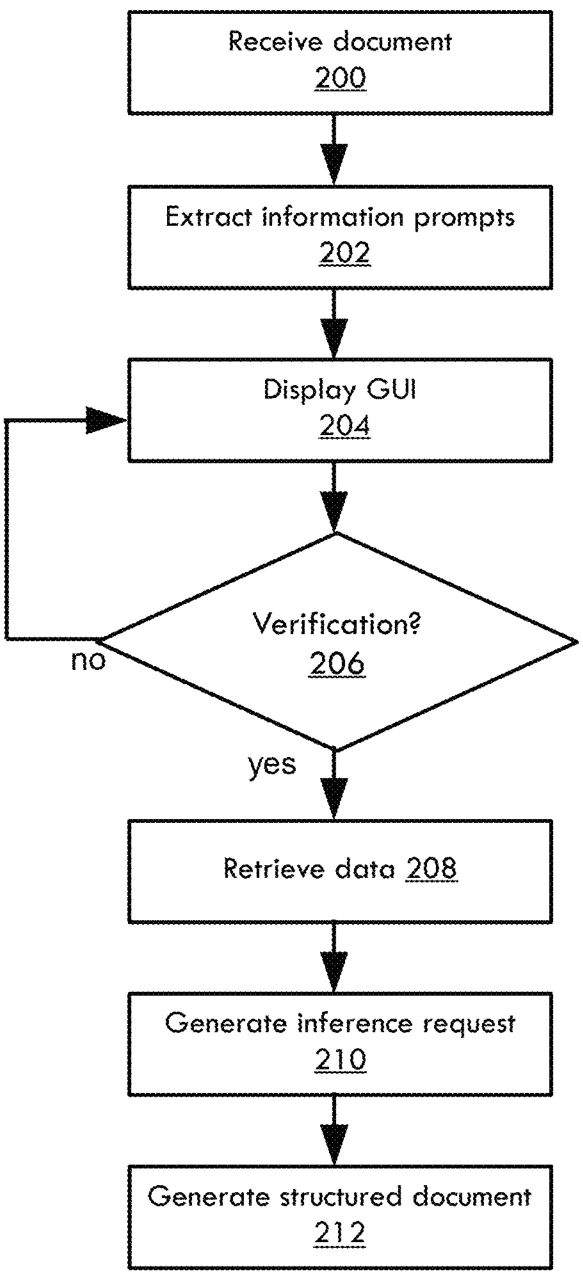
FIG. 2 illustrates a flow diagram for a method for automatically generating a structured document based on a plurality of data sources according to non-limiting embodiments or aspects.

Referring now to FIG. 2, a flow chart is shown for automatically generating a structured response document based on a plurality of data sources according to non-limiting embodiments. The steps shown in FIG. 2 are for example purposes only. It will be appreciated that non-limiting embodiments may involve additional steps, fewer steps, different steps, and/or a different order of steps. In some non-limiting embodiments or aspects, a step may be performed automatically in response to the completion of a previous step (e.g., may be performed without user intervention upon the completion of a previous step). The steps shown in FIG. 2 may be performed by one or more computing devices, such as computing device 100 shown in FIG. 1.

At step 200, a document is received that includes a plurality of prompts for information. The document may be uploaded to the computing device by a client computing device, as an example, or may be pasted as text or downloaded and/or retrieved by the computing device from a source. At step 202, prompts for information are extracted from the document received at step 200. For example, the document may be parsed to identify and extract a plurality of prompts for information. The prompts for information may be extracted with one or more models and/or rule-based algorithms configured to identify prompts for information within the document based on, for example, formatting, numbering, lettering, words, semantic matches with predefined keywords, lexical matches with predefined keywords, text classification, and/or the like.

At step 204, a GUI is generated and displayed to a user to verify one or more of the extracted prompts for information. The extracted prompts for information may be verified based on an interaction with a user. For example, the extracted prompts for information may be separately displayed on a GUI of a client computing device to present selectable options to facilitate a user to verify one or more prompts for information and/or modify one or more prompts for information. In non-limiting embodiments, the extracted prompts for information may also be verified by an automated process, such as an artificial intelligence agent or the like.

At step 206, if all the extracted prompts for information are verified, the method proceeds to step 208. If the extracted prompts are not verified, the GUI is continued to be displayed at step 204 until verification is received. At step 208, data elements are retrieved for the plurality of prompts for information. For example, in response to the prompts for information being verified at step 206, a computing device may initiate a retrieval process to retrieve a plurality of data elements from different data sources. For example, the computing device may separately search multiple data sources for each prompt for information. In non-limiting embodiments, the data sources may be preprocessed to convert individual data elements of each data source into vectors. The data element vectors may include, for example, an embedding of data content (e.g., text from the document) with metadata (e.g., topic, area, category, and/or the like). The content and metadata may be concatenated or otherwise combined for the embedding.

At step 210, one or more inference requests are generated based on the data elements retrieved at step 208 and the prompts for information. The inference request(s) may be configured to cause a machine-learning model, such as an LLM, to return an output, such as a structured document including responses to the prompts for information. In some non-limiting embodiments, an inference request may be separately generated for each prompt for information and may be input into a machine-learning model in series or in parallel. In such examples, steps 208 and 210 may repeat until an inference request has been generated with retrieved contextual data element(s) for each prompt for information. In some non-limiting embodiments, an inference request may be generated for all or a subset of prompts for information such that the machine-learning model is instructed to generate responses to multiple prompts for information as part of one output.

At step 212, a structured response document is generated based on one or more outputs of the inference requests generated at step 210. For example, a computing device may assemble multiple outputs based on one or more rules and/or templates. In some examples, the original input document including the prompts for information may be modified to generate the structured response document. In some examples, a machine-learning model may be prompted with the individual responses to generate a structured response document. In non-limiting embodiments, the initial output of the machine-learning model may include a structured response document, and the computing device may or may not format and/or modify the structured response document before outputting it. In some non-limiting embodiments, before the final structured response document is output, the output(s) and/or structured response document may be displayed on a GUI on a client computing device for the responses to the prompts for information to be validated. For example, a GUI may include one or more selectable options to validate, reject, and/or modify each individual response to each prompt for information.

In non-limiting embodiments, a multi-phase search may be performed to retrieve data elements from data sources (e.g., during step 208 of FIG. 2). A multi-phase search provides for an improved retrieval process for generating a response to prompts for information by combining multiple ranked search results to form a final, merged ranking that provides a more accurate ranking of relevance than existing retrieval processes. Non-limiting embodiments provide for a unique merger of ranked search results where a first set of ranked search results are not directly comparable to a second set of ranked search results (e.g., rankings based on cosine similarity score versus a BM25 score or the like). The merger provides for a more effective result that can be normalized more easily than a weighted sum of scores. Further, the merged ranking reduces the amount of contextual input data needed to prompt a machine-learning model, thereby reducing the use of computational resources.

Modern RAG systems rely on a retrieval process to retrieve relevant documents to serve as context for an LLM to generate an answer. The overall effectiveness of such systems is dependent on the quality of the data retrieved. In the context of responding to prompts for information, the question or request can be of a highly varied nature: some are general and conceptual, while others demand factual precision on technical terms, acronyms, product names, or specific figures. Existing approaches include a pure semantic search (e.g., a vector-based search) which often fails to identify data elements for retrieval that contain relevant but semantically distant keywords. For example, a semantic search may not distinguish between different ISO standards if they are not contextually differentiated in the training data of the embedding model. Another approach is a pure lexical search (e.g., keyword search), such as a Full-Text Search, which is rigid and lacks contextual understanding, and therefore can miss relevant documents that use synonyms or different phrasing to express the same information.

Figure 3:
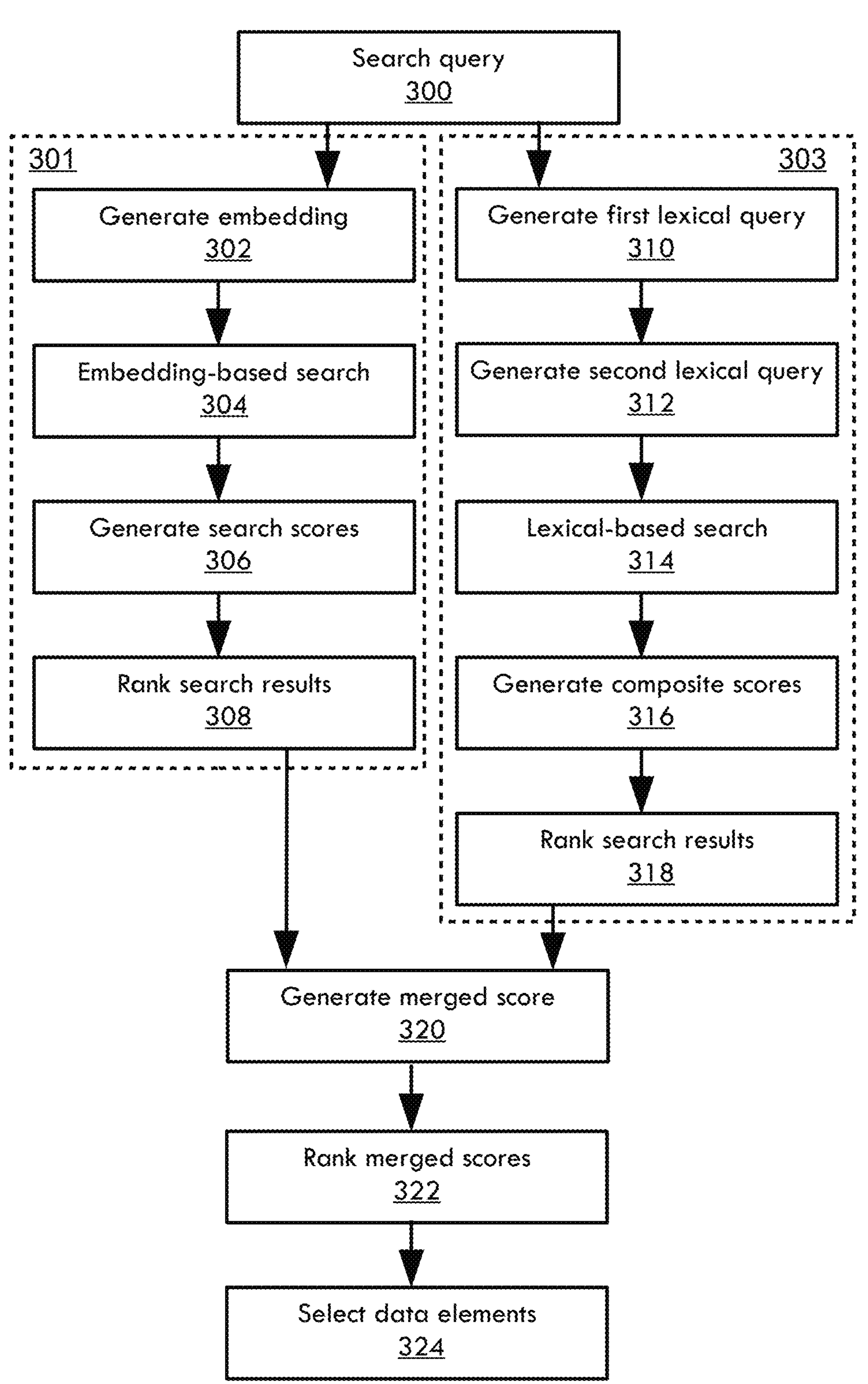
FIG. 3 illustrates another flow diagram for a method for automatically generating a structured document based on a plurality of data sources according to non-limiting embodiments or aspects.

Referring now to FIG. 3, a flow chart is shown for a method of searching multiple data sources with a multi-phase search according to non-limiting embodiments. The steps shown in FIG. 3 are for example purposes only. It will be appreciated that non-limiting embodiments may involve additional steps, fewer steps, different steps, and/or a different order of steps. In some non-limiting embodiments or aspects, a step may be performed automatically in response to the completion of a previous step (e.g., may be performed without user intervention upon the completion of a previous step). The steps shown in FIG. 3 may be performed by one or more computing devices, such as computing device 100 shown in FIG. 1.

A search query 300 is processed with a semantic search process 301 and a lexical search process 303. The two search processes 301, 303 may be performed in parallel or in series. In the semantic search 301, at step 302, embeddings are generated for each prompt for information. Generating the embeddings may include generating a vector-based representation of information being prompted for. For example, a pre-trained language model may be used to convert plaintext representations into vector representations corresponding to a semantic intent of the query.

At step 304, multiple data sources that have been generated into multi-dimensional vectors (e.g., embeddings) and indexed are searched by comparing the embeddings (e.g., a vector-based search). Steps 302 and 304 may be performed separately for each prompt for information. In some examples, the data sources are predetermined document vectors that represent the knowledge base for the prompts for information. In non-limiting embodiments, the predetermined document vectors may be generated by embedding, for each data element, the content of the data element and associated metadata (e.g., topic, area, category, and/or the like). These embeddings may be generated based on a concatenation of the data element content with the associated metadata to provide semantic context for data elements that would otherwise lack sufficient semantic meaning for effective retrieval. The search may be performed by searching for the closest vector match to the embeddings of the queries, using an algorithm to calculate distance in the multi-dimensional search space. Any distance metric and/or algorithm may be used, such as but not limited to cosine similarity to determine a distance based on the angle between vectors such that a smaller angle signifies a closer semantic relationship (e.g., more relevant than other vectors). At step 306, search scores are generated for each embedding. The search scores may be the distance metric and/or may be derived from the distance metric. At step 308, a ranked list of search results (e.g., candidate data elements) are output from the most to least semantically similar to the search query 300. The ranked search results may include a predetermined number of top search results (e.g., fifteen or the like).

In the lexical search 303 shown in FIG. 3, data elements may be identified with a full-text search engine that include exact keywords or phrases from the query or linguistic variations of such keywords or phrases. In non-limiting embodiments, the lexical search 303 may include a single lexical query. In other non-limiting embodiments, the lexical search 303 may include two or more queries that are performed simultaneously or in sequence and then combined into composite search scores. At step 310, a first lexical query may be generated to include a high-precision query configured to identify exact matches based on, for example, words or phrases enclosed in quotes or connected with "AND" (e.g., "&") Boolean operators. In some non-limiting examples, a configurable search function from a software library may be used. This search function may parse the input string and apply predefined rules. As an example, rules may include removing common "stop" words (e.g., "what," "are", "your", "for", and/or the like), reducing the remaining words to a root form (e.g., through a stemming process). As an example, if the search query is "What are your security certifications for data centers?," the words kept after removing stop words may include: security, certifications, data, centers. The words after stemming may include: secur, certif, data, center. The query may then appear as 'secur' & 'certif' & 'data' & 'center' or the like, returning all data elements that contain all the following terms: a word starting with secur, a word starting with certif, a word starting with data, AND a word starting with center.

At step 312, a second lexical query may be generated to include a high-recall query that is broader than the first lexical query by using the most meaningful terms of the query (e.g., longer words, acronyms, numbers, and/or the like) and searches for any document containing at least one of these terms (e.g., using an "OR" Boolean operator ("|") or the like). Generating the second lexical query may include extracting significant terms by filtering the query to retain numbers, acronyms, and words of three or more characters, as an example. Generating the second lexical query may also include adding a prefix wildcard (e.g., :*) to longer words to match variations (e.g., security:* will match "security," "securitization," and the like). These significant terms may then be joined with an OR and passed to a software search function. As an example, for the search query "What are your security certifications for data centers?" the significant terms extracted (with wildcards) may include: ['security:*', 'certifications:*', 'data:*', 'centers:*']. A stemming process may be performed and query may then appear as 'secur':*| 'certif':*| 'data':*| 'center':*.

At step 314 the first and second lexical queries are performed, although it will be appreciated that step 314 may be performed as two separate steps for each search query 300.

At steps 316 and 318, the search results for the first and second lexical queries are combined by calculating a composite score based on a weighted combination of the relevance scores from both the first query (e.g., high-precision query) and second query (e.g., high-recall query). In some non-limiting embodiments, a scoring bonus may be associated with data elements that satisfy (e.g., match) the first query (high-precision query) to add weight to the composite score. In non-limiting embodiments, a composite score is calculated for each returned data element from the first and second lexical search queries, where the first query results are associated with a precision score and are weighted with a precision weight, and the second query results are associated with a recall score and are weighted with a recall weight. As an example, the score may be: (recall_weight*recall_score)+(precision weight*precision_score)+(bonus weight*precision_match_bonus). Each of recall_weight, precision_weight, and bonus_weight may be predetermined and/or configurable coefficients that adjust the importance of each component. The precision_match_bonus may include a binary value (e.g., "1" if the data element includes an exact match according to the first query, "0" otherwise). This bonus boosts the ranking of data elements that are highly relevant. It will be appreciated that other scoring algorithms may be used with fewer or additional coefficients and/or other variables.

At step 318, a ranked list of search results (e.g., candidate data elements) are output from the most to least lexically similar to the search query 300. The ranked search results may include a predetermined number of top search results (e.g., fifteen or the like). All search results with a composite score greater than zero are sorted in descending order based on this score and the predetermined number of top results (e.g., the top fifteen or the like) may be selected. In non-limiting embodiments, the semantic search 301 and lexical search 303 may be configured to output the same number of search results.

At step 320, the search results from the semantic search 301 may be merged with the search results of the lexical search 310. This step may start with two ranked lists from steps 308 and 318, respectively. For each unique data element in either list, an algorithm may be applied to determine a fused (e.g., merged) score, such as: (1/(k+rank_Lexical))+(1/(k+rank_Semantic)), where rank_Lexical and rank_Semantic are the positions of each data element in a respective ranked list. If a data element does not appear in one of the lists, its rank for that list is treated as effectively infinite, causing that part of the formula to contribute zero to the final score. In the above example algorithm, k is a configurable constant (e.g., k=60) that serves as a smoothing factor, diminishing the influence of documents with very low ranks. As a result of the fused scores, a data element that is a top result in the lexical search but not found by the semantic search will still receive a high score relative to other data elements, and a data element that is a top result in the semantic search but not found by the lexical search will still receive a high score relative to other data elements.

At step 322, the complete set of unique data sets from both searches 301, 303 is re-ranked in descending order based on the merged score determined at step 320. At step 324, a predetermined number of top data elements in the new ranking are retrieved. For example, the top K data elements may be used from this final, merged list (e.g., K=5). It will be appreciated that any number of results may be returned in non-limiting embodiments.

In non-limiting embodiments, a generated structured response document may be validated by one or more users. In some non-limiting embodiments, a collaborative validation workflow may be provided to facilitate validation from multiple validation sources. For example, after responses to a plurality of prompts for information are automatically generated and before a final structured response document is output, the responses may be validated through a collaborative process involving multiple entities. Such a collaborative validation process improves the efficiency of document validation by dynamically routing different portions of the structured response document to different entities, avoiding unnecessary communications between entities to complete the validation.

Figure 4:
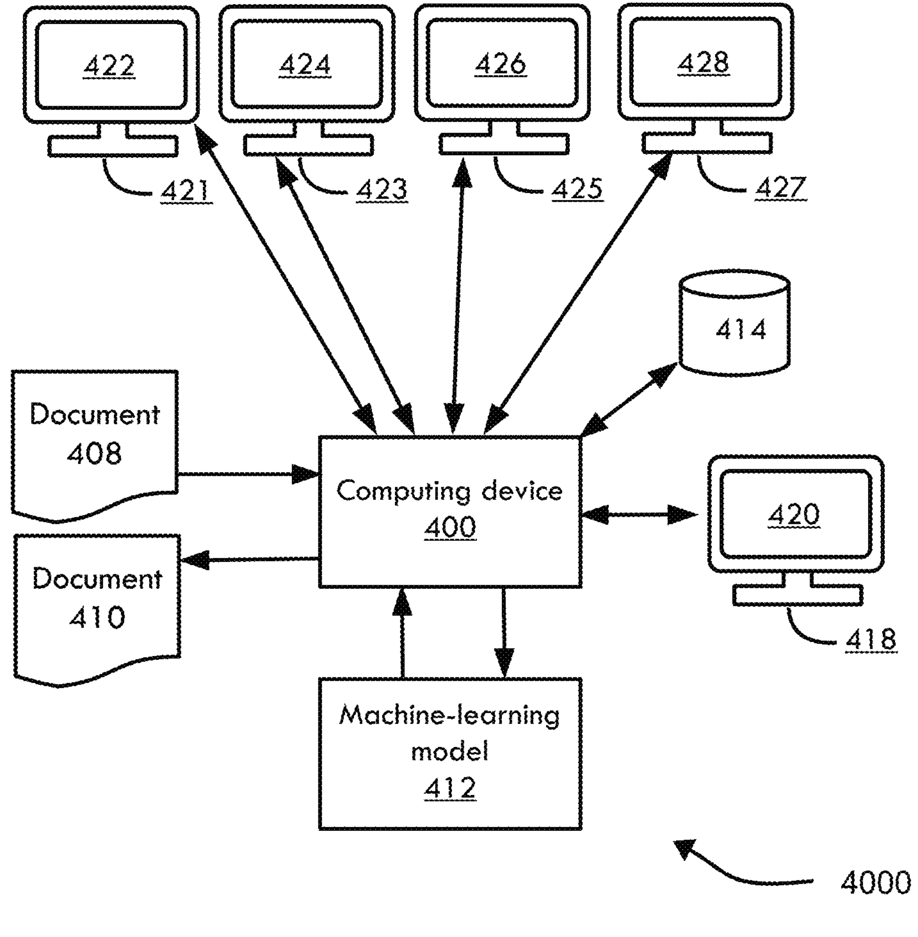
FIG. 4 illustrates a schematic diagram of a system for automatically generating a structured document with collaborative validation according to non-limiting embodiments or aspects.

Referring now to FIG. 4, a system 4000 for automatically generating a structured document with collaborative validation is shown according to non-limiting embodiments. The system 4000 includes a computing device 400 configured to execute one or more software applications. The computing device 400 may be in communication with multiple client computing devices 418, 421, 423, 425, 427 via one or more APIs or other communication methods. In non-limiting embodiments, the client computing devices 418, 421, 423, 425, 427 may be arranged in different physical locations and/or operated by different users. A document 408 including prompts for information may be processed by the computing device 400 as described herein to generate a structured response document 410 including individual responses to each of the plurality of prompts for information in the document 408. The processing may be performed in response to a requesting user operating client computing device 418 selecting an option on a GUI 420 on the computing device 418. The requesting user may interact with the computing device 418 as described in connection with computing device 118 and computing device 100 in FIG. 1.

With continued reference to FIG. 4, in non-limiting embodiments, the computing device 400 may receive individual responses to each prompt for information. For each prompt for information and corresponding response, the computing device 400 may classify the prompt and/or response. Such classification may be performed by a machine-learning model 412 that is trained to process the prompt for information and/or response to analyze its semantic content and assign a classification to the prompt for information and/or response out of a predefined number of categories. In non-limiting embodiments, the categories may be based on a domain of expertise within an organization, such as but not limited to "legal," "compliance," "corporate social responsibility (CSR)," "finance," "technical," "personnel," "marketing," and/or the like. In non-limiting embodiments, the machine-learning model 412 may include, for example, a text classification model fine-tuned and/or trained on an internal dataset of prompt-response (e.g., question-answer) pairs. In non-limiting embodiments, the machine-learning model 412 may be an LLM guided by instructions via prompting techniques (e.g., zero-shot where the model has not been trained on the specific domains, few-shot where there are limited training examples, or the like) to perform the classification. The classification may occur during an initial processing of the document 408 before the responses are generated (e.g., during steps 202 or 210 of the method shown in FIG. 2), while the responses are generated, or after the responses are generated. In non-limiting embodiments, the classification may be performed for each prompt for information and/or response individually or as a batch.

Still referring to FIG. 4, the computing device 400 may store each prompt-response pair in a task queue 414 in association with an entity of a plurality of different entities (e.g., individuals, departments, teams, internal groups, and/or the like) that will validate the response. The entity is identified based on the category of the prompt and/or response, such as based on a look-up table corresponding entities to categories. In some examples, a response may be validated by multiple different entities such that validation from each is sought and/or required. Each category may be associated to one or more entities, and each entity may be assigned to one or more categories. The task queue 414 may be a data structure used for managing all the responses or may be individual, separate queues for each different reviewing entity. Computing devices 421, 423, 425, 427 each represent one or more different entities in the example shown in FIG. 4, although it will be appreciated that each entity may include multiple computing devices (e.g., where an entity is a team or internal group, each member may have one or more computing devices). When a response for review and validation is assigned to the task queue 414, a notification may be automatically generated and communicated to the assigned entity or entities. The notification may include an email, an alert in a team messaging application, a message displayed on a GUI (e.g., GUIs 422, 424, 426, 428), a message directly within an interface of a system or application, and/or the like. The notification may alert the assigned entity (e.g., an individual or one or more members of a group) that a new validation task has been assigned to them, cause display of a GUI, provide a link to display the validation task, and/or the like.

The GUIs 422, 424, 426, 428 may include one or more selectable options configured to validate a response to a prompt for information. For example, a GUI may display a list of validation tasks assigned to an entity. Upon selecting a task, the GUI may display the original prompt for information and the response. In some examples, the data element(s) or excerpt therefrom used to generate the response may be displayed. In some examples, contextual metadata may be displayed. The entity may then perform one of several actions through the GUI, including: (1) approve: if the answer is correct and complete, the entity may validate it with a single action; (2) edit and approve: if the answer is partially correct, the entity may edit it directly within the GUI before marking it as validated; and (3) reject or comment: if the answer is incorrect, the entity can reject it and leave a comment explaining the issue, which may be configured to trigger a new generation attempt (e.g., generating another response to the prompt for information) and/or a notification to a requesting user (e.g., through client computing device 418).

With continued reference to FIG. 4, the computing device 400 may monitor the task queue 414 and/or responses received from each entity (e.g., from computing devices 421, 423, 425, 427) until a validation response is received for each response to each prompt for information. If one or more responses are not validated, the computing device 400 may send reminder notifications and/or re-generate the response based on entity feedback. In some non-limiting embodiments, once the computing device 400 has determined that each response has been validated by monitoring and updating the respective statuses, it may automatically communicate a notification to the requesting user (e.g., through client computing device 418) and/or automatically proceed with assembling and/or outputting a final structured response document 410.

Figure 5:
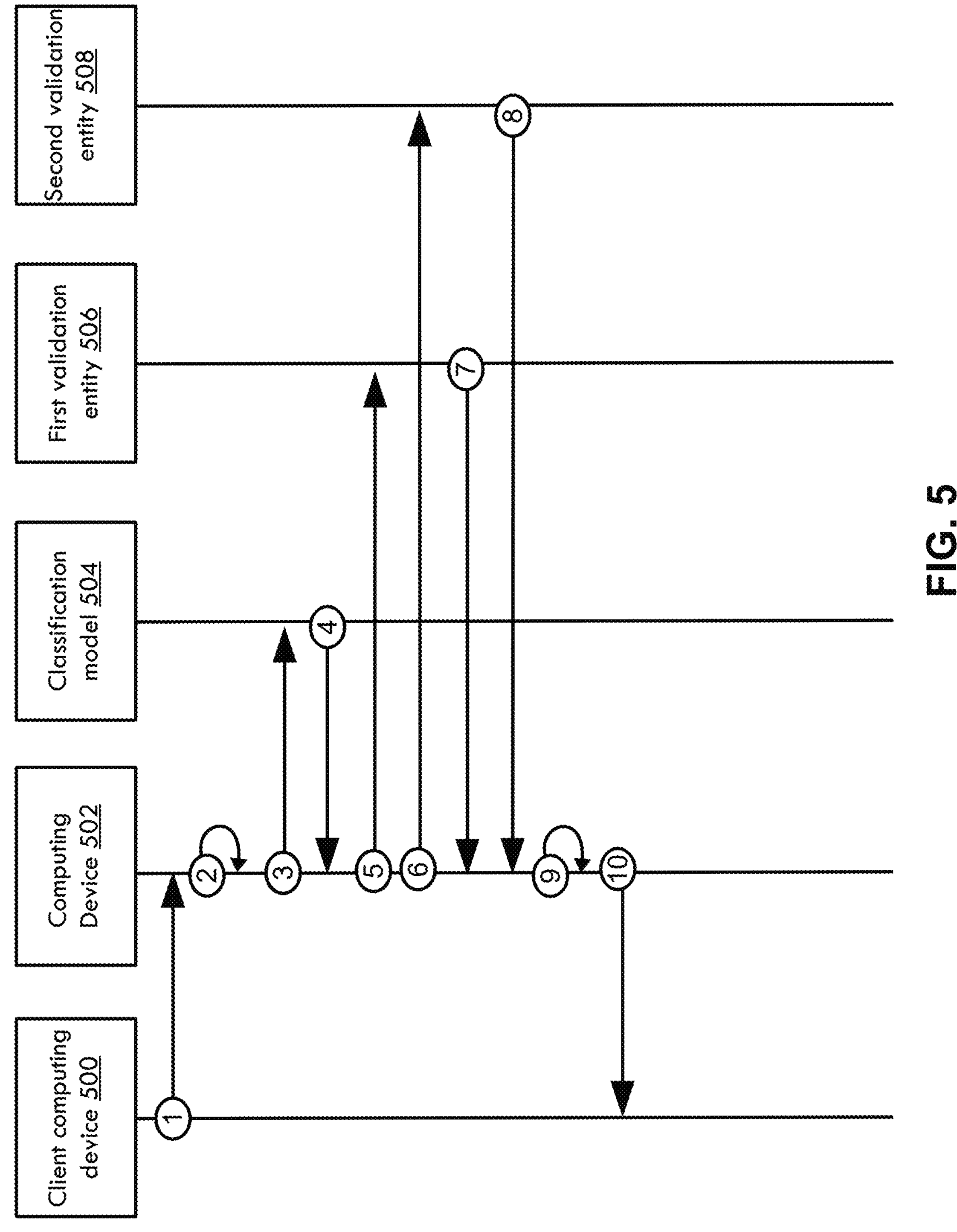
FIG. 5 illustrates a sequence diagram of a method for automatically generating a structured document with collaborative validation according to non-limiting embodiments or aspects.

Referring now to FIG. 5, a sequence diagram is shown for automatically generating a structured document with collaborative validation according to non-limiting embodiments. The steps shown in FIG. 5 are for example purposes only. It will be appreciated that non-limiting embodiments may involve additional, fewer, different, and/or a different order of steps. In some non-limiting embodiments or aspects, a step may be performed automatically in response to the completion of a previous action (e.g., may be performed without user intervention upon the completion of a previous step).

At step 1 of FIG. 5, a computing device 502 receives a document including a plurality of prompts for information from a client computing device 500 of a requesting user. The computing device 502 may include a server computer, as an example. At step 2, the computing device 502 automatically generates responses to the plurality of prompts for information in the document. At steps 3 and 4, the computing device 502 communicates with a classification model 504 to classify each prompt for information and/or a corresponding generated response based on a plurality of predefined categories. As explained herein, the classification model 504 may include an LLM with guided prompts. The categories may each relate to a different validation entity, such as an individual or group of individuals. At step 5, a validation task is communicated to a first validation entity 506 (e.g., such as a computing device operated by a first validation entity, a task queue accessible by the first validation entity, and/or the like) that includes a prompt for information and/or response that has been classified into a category associated with the first validation entity 506. At step 6, a separate validation task is communicated to a second validation entity 508 (e.g., such as a computing device operated by a second validation entity, a task queue accessible by the second validation entity, and/or the like) that includes a prompt for information and/or response that has been classified into a category associated with the second validation entity. Steps 5 and 6 may also include notifications automatically communicated to one or more individuals associated with the first and second validation entities.

With continued reference to FIG. 5, at step 7 and 8, the first validation entity and second validation entity respectively respond to the validation tasks with an input, such as a selection of a validation option, a selection of a rejection option, a modified (e.g., edited or new) response, and/or the like. In non-limiting embodiment, a rejection and/or modified response may automatically cause for the response to be re-generated (e.g., based on the same data elements or based on an updated retrieval of different data elements). At step 9 the computing device 502 generates a final structured response document by assembling the validated responses once validations have been received for each response. At step 10, a final structured response document may be output to the requesting user at client computing device 500. A notification may be generated and communicated to the requesting user through the client computing device 500.

In non-limiting embodiments, collaborative validation automates a "dispatcher" or "project manager" function of a validation process such that the requesting user (e.g., operator of client computing device 418) does not need to have deep knowledge of an internal organization of entities and/or individuals to know who should validate different responses. In non-limiting embodiments, the validation may be performed by one or more agent processes, acting as an intelligent, automated organizational expert that can distribute validation tasks to different experts (e.g., different entities).

Non-limiting embodiments decouple the initial request for a response to a plurality of prompts for information from an internal distribution to various entities for validation. Non-limiting embodiments use a dynamic classification approach to route validation tasks such that new and/or different entities can be assigned to different categories to scale and adapt to a growing and/or changing organization. The classification model can be improved and trained with new data over time, allowing it to adapt to the evolution of the organization and its subject matter without requiring a complex rewriting of the routing logic. This long-term maintainability is a significant architectural advantage of non-limiting embodiments described herein. When combined with the RAG-based process described here, collaborative validation allows for the overall generation process for a structured response document to be automated to a fuller extent and to scale to any size organization.

In some examples, the automated processing of a document including a plurality of prompts for information may include generating responses to hundreds, or even thousands, of individual prompts for information. Each response may require one or more interactions with a machine-learning model, including calls to external services such as LLMs via APIs or the like. These interactions are subject to transient failures such as network errors, service saturation (e.g., rate limiting errors), timeouts, and/or internal, non-deterministic errors within the machine-learning model itself. Processing different prompts in different informational domains within a single script would include multiple points of potential failure or error. For example, the failure of a single API call, even for the last prompt in a long document of numerous prompts, may cause the entire process to halt and expend unnecessary computational resources and time to restart the process. A queue-based approach may address some of these issues but does not natively solve several complex problems such as managing the overall state of the process (e.g., monitoring which questions are complete, which have failed, which need validation, which need re-generation, and/or the like), implementing a robust retry logic (e.g., with progressive backoff delays), and providing the ability to observe and debug the processing of an entire document of prompts for information as a whole.

Non-limiting embodiments provide for a method and system to orchestrate the automatic generation of a structured document that natively provides for failure isolation, state persistence, an automatic and configurable retry policy, and observability for each individual task. Non-limiting embodiments may leverage an existing orchestration engine, such as Temporal, although it will be appreciated that a custom orchestration engine may also be created for this purpose. In non-limiting embodiments, the processing of a document of prompts for information may be modeled as a parent process that controls the execution of several child micro-tasks (e.g., activities) where each micro-task is atomic, transactional, and resilient.

In non-limiting embodiments, a parent workflow process may include at least the steps shown in FIG. 2, although it will be appreciated that different workflows may be used. The workflow may be durable such that its execution state (e.g., which steps have been completed, which steps still need to be completed, what the intermediate data is, and/or the like) is constantly persisted by an orchestration engine. A workflow can thus run for long durations (e.g., minutes or hours) and can survive crashes of the computing devices executing it. The processing of each individual prompt for information may be an "activity" that represents granular-level tasks and can represent an atomic and transactional unit of work. For example, an activity may include a pipeline of tasks including executing a retrieval process (e.g., the RAG process described herein), generating LLM prompts to cause an LLM to output responses, and storing the output. A pipeline execution activity for each prompt for information may be executed in parallel as a set of tasks to be completed. The status (e.g., pending, running, success, failure, or the like) of each prompt for information may be tracked individually.

In non-limiting embodiments, an activity may include an automatic retry policy that specifies the parameter values that trigger an automatic re-execution of the activity. For example, if an activity fails due to an error deemed transient (e.g., such as a network error or a timeout when calling the LLM API), the orchestrator may wait for a predefined period (e.g., a "backoff" strategy) and, when that period expires, may automatically re-execute only that specific activity (e.g., for a specific prompt for information and response pair). A user may configure the number of attempts (e.g., three, five, ten, and/or the like), the time period, and/or other parameters.

In non-limiting embodiments, if an activity fails (e.g., determined to be erroneous after all retry attempts have been performed), it may be marked as "failed" without interrupting the parent workflow. The parent workflow can continue its execution, process all other prompts for information, and generate the final structured response document. The final state of the workflow may then reflect a partial success, with a detailed history of which prompts for information and/or responses failed and why (e.g., lack of validation, communication error, and/or the like). In this manner, the workflow can continue being executed and other responses can be structured into a near-complete structured response document.

In non-limiting embodiments, when a workflow spawns numerous activities that all need to call the same external, rate-limited API (such as an LLM service), there is a risk of the activities collectively overwhelming the service and causing a cascade of failures (e.g., a "thundering herd" problem). To solve this, in non-limiting embodiments, the orchestration engine may be configured to implement a shared rate limiter. Activities within the workflow can be configured to use this shared limiter. In such an example, before an activity makes an API call, it requests a permit from the limiter. The limiter, which maintains a global state of all recent API calls made by all participating activities, may either grant the permit immediately or intelligently delay the execution of the activity until the rate limit window allows for another call (e.g., based on a predetermined threshold or dynamically based on processing metrics).

In non-limiting embodiments, an orchestration engine continuously records the complete state of the workflow, including input parameters, the results of each activity, and the history of every attempt to execute an activity. This allows the orchestration engine to resume execution exactly where it left off after a crash and makes it possible to query the progress of a parent task (e.g., processing a document with multiple prompts for information). In non-limiting embodiments, the stored information includes how many attempts were made, the exact errors encountered during failures, and the time taken for each attempt, as examples.

In non-limiting embodiments, business events may be generated from within the workflow. Business events may include human-readable status updates that correspond to milestone tasks (e.g., discrete tasks) in the business process (e.g., "prompt extraction complete," "semantic search finished," "generating final answer," and/or the like). These events are configured to be displayed on a GUI, allowing the application to provide real-time, understandable feedback to a non-technical user about the progress of the long-running task (e.g., processing of the document of prompts for information). This provides a transparent, "glass box" view of the process to the end-user.

In some non-limiting embodiments, the state of the workflow (e.g., the current status of one of more task(s)) may be subscribed to or polled by a client computing device such that the client computing device actively retrieves the state on a continuous or periodic basis. In other non-limiting embodiments, the state of the workflow may be automatically communicated to the client computing device upon completion without waiting for a poll request or the like. In some non-limiting embodiments, the progress of the workflow may be visualized as a status bar on a GUI. The progress bar may include multiple linear segments that each correspond to a business event. In some non-limiting embodiments, a GUI may display a checklist of stages (e.g., such as individual tasks) that are automatically marked as completed (e.g., with a check, icon, color change, and/or the like) when the underlying task is complete. In some non-limiting embodiments, a GUI may provide a textual status that dynamically changes (e.g., "Step 1 of 3: Analyzing document . . . ", "Step 2 of 3: Searching for information . . . ", and/or the like).

In non-limiting embodiments, orchestration of the tasks for automatically generating a structured response document allows for the system to survive network outages, timeouts (e.g., HTTP timeouts for API requests), system crashes, data unavailability, and/or the like, without data loss and while automatically persisting the workflow state.

Referring now to FIGS. 6-10, shown are GUIs according to non-limiting embodiments. FIG. 6 shows a request GUI 600 with selectable options for a user to identify the type of input document (e.g., "RFI"), an internal product or service category (e.g., "Widget X") identifying a domain of information within an organization, and the document (e.g., "rfi_simple.xlsx"). The request GUI 600 may automatically initiate execution of the automated structured response document generation workflow, including the extraction of the prompts for information from the document.

FIGS. 7 and 8 show views of a verification GUI 700, 702 displaying the extracted prompts for information for verification. The prompts are numbered (e.g., "Question 1", "Question 2", etc.) and include a selectable option to delete the prompt. Selectable options are also provided to add a prompt for information and to generate responses. Selection of the option to generate responses may cause the automated continued execution of the workflow, including the RAG process described herein.

FIG. 9 shows a validation GUI 800 that displays a response to each prompt for information. The validation GUI 800 may include selectable options to translate the responses to a selected language and to export the responses (e.g., as a structured response document or the like). FIG. 10 shows a metadata GUI 802 that displays contextual metadata for a response. The metadata GUI 802 may be displayed in response to user interaction with the response GUI 800 shown in FIG. 9. The metadata GUI 802 may include a listing of the source documents used to extract the data elements and, for each source document, the area (e.g., category) of the source document (e.g., "Organization"), the topic (e.g., "Org chart"), and a link to the source document (e.g., "Sharepoint"). The GUIs 800, 802 may be used to validate the responses as described herein.

Figure 11:
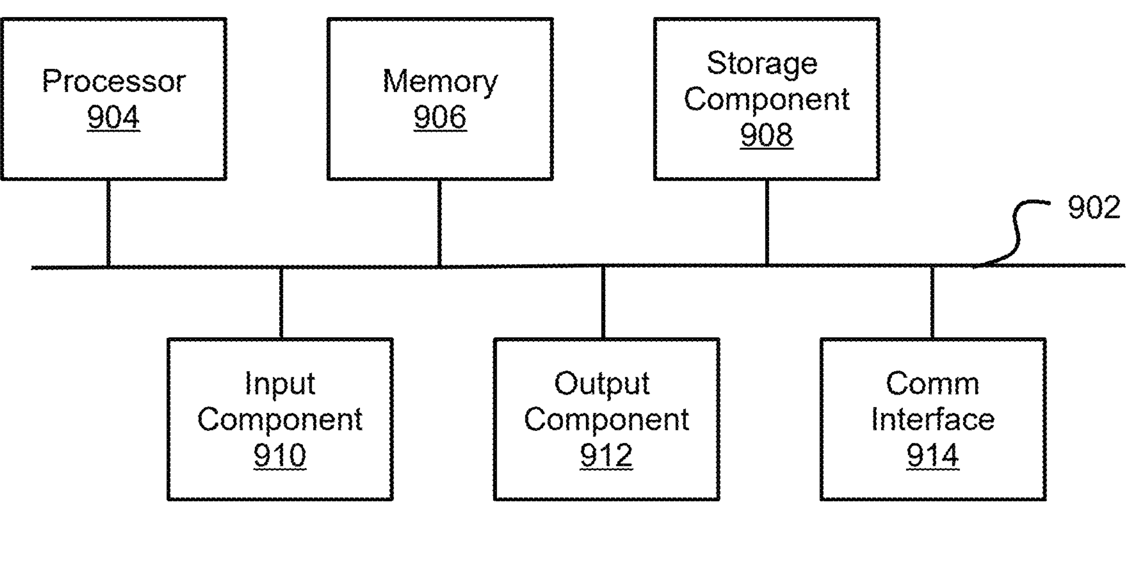
FIG. 11 illustrates example components of a device used in connection with non-limiting embodiments or aspects of systems, methods, and computer program products for automatically generating a structured document based on a plurality of data sources.

Referring now to FIG. 11, shown is a diagram of example components of a computing device 900 for implementing and performing the systems and methods described herein according to non-limiting embodiments. In some non-limiting embodiments, device 900 may include additional components, fewer components, different components, or differently arranged components than those shown in FIG. 11. Device 900 may correspond to the computing device 100 shown in FIG. 1. Device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a CPU, a GPU, an accelerated processing unit (APU), etc.), a microprocessor, a digital signal processor (DSP), and/or any processing component (e.g., an FPGA, an application-specific integrated circuit (ASIC), etc.) that can be programmed or configured to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 11, storage component 908 may store information and/or software related to the operation and use of device 900. For example, storage component 908 may include a hard disk (e.g., a magnetic disk, an optical disk, a magneto-optic disk, a solid-state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A method comprising:

extracting, with at least one processor, a plurality of information prompts from a document;

displaying, in an interactive graphical user interface, the plurality of information prompts and at least one selectable option configured to modify the plurality of information prompts;

verifying the plurality of information prompts;

in response to verifying the plurality of information prompts, automatically retrieving a plurality of data elements corresponding to the plurality of information prompts from a plurality of different data sources, each data element of the plurality of data elements corresponding to at least one information prompt of the plurality of information prompts;

generating, with at least one processor, at least one inference request based on the plurality of information prompts and the plurality of data elements;

receiving a plurality of responses to the plurality of information prompts based on processing the at least one inference request with at least one machine-learning model;

determining a classification of at least one information prompt of the plurality of information prompts;

determining a validation source from a plurality of validation sources for the at least one information prompt based on the classification;

automatically routing a response to the at least one information prompt from the plurality of responses to the validation source; and generating, with at least one processor, a structured document based on the plurality of responses.

2. The method of claim 1, wherein automatically retrieving the plurality of data elements corresponding to the plurality of information prompts comprises:

for each information prompt of the plurality of information prompts:

conduct a semantic search of the plurality of data sources;

conduct a lexical search of the plurality of data sources;

merge an output of the semantic search with an output of the lexical search to generate a merged ranking of data sources or data elements;

retrieve at least one data element from at least one data source based on the merged ranking.

3. The method of claim 2, wherein the at least one inference request comprises a plurality of inference requests, and wherein generating the at least one inference request based on the plurality of information prompts and the plurality of data elements comprises:

generating an inference request for each information prompt of the plurality of information prompts, each inference request comprising the at least one data element retrieved based on the information prompt.

4. The method of claim 2, wherein conducting the lexical search comprises:

querying the plurality of data sources with a first search query based on a sequence of tokens in each information prompt, resulting in a first search output;

querying the plurality of data sources with a second search query based on individual tokens in each information prompt, resulting in a second search output; and combining the first search output and the second search output to form the output of the lexical search.

5. The method of claim 4, wherein combining the first search output and the second search output comprises:

generating a lexical score for each search result in the first search output and the second search output by:

generating a first relevance score based on a first weight and the first search output;

generating a second relevance score based on a second weight and the second search output;

generating a boost score based on the first search output; and combining the first relevance score, the second relevance score, and the boost score.

6. The method of claim 1, further comprising:

generating a second interactive graphical user interface based on at least one output received from processing the at least one inference request with the at least one machine-learning model, the second interactive graphical user interface comprising a plurality of responses to the plurality of information prompts and at least one feedback option configured to receive user input associated with at least one response of the plurality of responses; and updating at least one of the machine-learning model and a search algorithm configured to automatically retrieve the plurality of data elements based on the user input associated with the at least one response of the plurality of responses.

7. The method of claim 6, wherein the at least one feedback option comprises: a first feedback option configured to receive a selection of a predefined feedback response from at least two feedback responses, and a second feedback option configured to receive a freeform response from a user, wherein the structured document is generated based on at least one of a predefined feedback response and the freeform response.

8. The method of claim 7, further comprising:

automatically updating language translations of a response of the plurality of responses based on the freeform response.

9. The method of claim 6, wherein the second interactive graphical user interface comprises a plurality of source objects, each source object based on a data element of the plurality of data elements, each source object comprising at least a portion of the data element and at least one of the following: metadata associated with a data source including the data element, a classification of the data element, a classification of a data source including the data element, or any combination thereof.

10. The method of claim 1, wherein verifying the plurality of information prompts comprises:

determining a classification of at least one information prompt of the plurality of information prompts;

determining a verification source from a plurality of verification sources based on the classification;

automatically routing the at least one information prompt to the verification source; and receiving, from the verification source, a verification of the at least one information prompt.

11. The method of claim 1, further comprising:

displaying a second interactive graphical user interface to a validation source, the second interactive graphical user interface configured to receive a modification of the response;

receiving the modification from the validation source through the second interactive graphical user interface; and replacing the response with the modification in the structured response.

12. The method of claim 1, further comprising: generating a final structured response based on receiving validation responses from all validation sources that received a routed response.

13. A system comprising:

at least one computing device configured to:

extract a plurality of information prompts from a document;

display, in an interactive graphical user interface, the plurality of information prompts and at least one selectable option configured to modify the plurality of information prompts; verify the plurality of information prompts;

in response to verifying the plurality of information prompts, automatically retrieve a plurality of data elements corresponding to the plurality of information prompts from a plurality of different data sources, each data element of the plurality of data elements corresponding to at least one information prompt of the plurality of information prompts;

generate at least one inference request based on the plurality of information prompts and the plurality of data elements;

receive a plurality of responses to the plurality of information prompts based on processing the at least one inference request with at least one machine-learning model; determine a classification of at least one information prompt of the plurality of information prompts;

determine a validation source from a plurality of validation sources for the at least one information prompt based on the classification;

automatically route a response to the at least one information prompt from the plurality of responses to the validation source; and generate a structured document based on the plurality of responses.

14. The system of claim 13, wherein automatically retrieving the plurality of data elements corresponding to the plurality of information prompts comprises:

for each information prompt of the plurality of information prompts:

conduct a semantic search of the plurality of data sources;

conduct a lexical search of the plurality of data sources;

merge an output of the semantic search with an output of the lexical search to generate a merged ranking of data sources or data elements; and retrieve at least one data element from at least one data source based on the merged ranking.

15. The system of claim 14, wherein the at least one inference request comprises a plurality of inference requests, and wherein generating the at least one inference request based on the plurality of information prompts and the plurality of data elements comprises:

generating an inference request for each information prompt of the plurality of information prompts, each inference request comprising the at least one data element retrieved based on the information prompt.

16. The system of claim 14, wherein conducting the lexical search comprises:

querying the plurality of data sources with a first search query based on a sequence of tokens in each information prompt, resulting in a first search output;

querying the plurality of data sources with a second search query based on individual tokens in each information prompt, resulting in a second search output; and combining the first search output and the second search output to form the output of the lexical search.

17. The system of claim 16, wherein combining the first search output and the second search output comprises:

generating a lexical score for each search result in the first search output and the second search output by:

generating a first relevance score based on a first weight and the first search output;

generating a second relevance score based on a second weight and the second search output;

generating a boost score based on the first search output; and combining the first relevance score, the second relevance score, and the boost score.

18. The system of claim 13, the computing device further configured to:

generate a second interactive graphical user interface based on at least one output received from processing the at least one inference request with the at least one machine-learning model, the second interactive graphical user interface comprising a plurality of responses to the plurality of information prompts and at least one feedback option configured to receive user input associated with at least one response of the plurality of responses; and update at least one of the machine-learning model and a search algorithm configured to automatically retrieve the plurality of data elements based on the user input associated with the at least one response of the plurality of responses.

19. The system of claim 18, wherein the at least one feedback option comprises: a first feedback option configured to receive a selection of a predefined feedback response from at least two feedback responses, and a second feedback option configured to receive a freeform response from a user, wherein the structured document is generated based on at least one of a predefined feedback response and the freeform response.

20. The system of claim 19, the computing device further configured to:

automatically update language translations of a response of the plurality of responses based on the freeform response.

21. The system of claim 18, wherein the second interactive graphical user interface comprises a plurality of source objects, each source object based on a data element of the plurality of data elements, each source object comprising at least a portion of the data element and at least one of the following: metadata associated with a data source including the data element, a classification of the data element, a classification of a data source including the data element, or any combination thereof.

22. The system of claim 13, wherein verifying the plurality of information prompts comprises:

determining a classification of at least one information prompt of the plurality of information prompts;

determining a verification source from a plurality of verification sources based on the classification;

automatically routing the at least one information prompt to the verification source; and receiving, from the verification source, a verification of the at least one information prompt.

23. The system of claim 13, the computing device further configured to:

display a second interactive graphical user interface to a validation source, the second interactive graphical user interface configured to receive a modification of the response;

receive the modification from the validation source through the second interactive graphical user interface; and replace the response with the modification in the structured response.

24. The system of claim 13, the computing device further configured to:

generate a final structured response based on receiving validation responses from all validation sources that received a routed response.

25. A computer program product comprising at least one non-transitory computer-readable medium including program instructions that, when executed by at least one processor, cause the at least one processor to:

extract a plurality of information prompts from a document;

display, in an interactive graphical user interface, the plurality of information prompts and at least one selectable option configured to modify the plurality of information prompts;

verify the plurality of information prompts;

in response to verifying the plurality of information prompts, automatically retrieve a plurality of data elements corresponding to the plurality of information prompts from a plurality of different data sources, each data element of the plurality of data elements corresponding to at least one information prompt of the plurality of information prompts;

generate at least one inference request based on the plurality of information prompts and the plurality of data elements;

receive a plurality of responses to the plurality of information prompts based on processing the at least one inference request with at least one machine-learning model;

determine a classification of at least one information prompt of the plurality of information prompts;

determine a validation source from a plurality of validation sources for the at least one information prompt based on the classification;

automatically route a response to the at least one information prompt from the plurality of responses to the validation source; and generate a structured document based on the plurality of responses.

26. A method comprising:

extracting, with at least one processor, a plurality of information prompts from a document;

displaying, in an interactive graphical user interface, the plurality of information prompts and at least one selectable option configured to modify the plurality of information prompts;

verifying the plurality of information prompts, wherein verifying the plurality of information prompts comprises:

determining a classification of at least one information prompt of the plurality of information prompts;

determining a verification source from a plurality of verification sources based on the classification;

automatically routing the at least one information prompt to the verification source; and receiving, from the verification source, a verification of the at least one information prompt;

in response to verifying the plurality of information prompts, automatically retrieving a plurality of data elements corresponding to the plurality of information prompts from a plurality of different data sources, each data element of the plurality of data elements corresponding to at least one information prompt of the plurality of information prompts;

generating, with at least one processor, at least one inference request based on the plurality of information prompts and the plurality of data elements and;

generating, with at least one processor, a structured document based on processing the at least one inference request with at least one machine-learning model.

27. The method of claim 26, wherein automatically retrieving the plurality of data elements corresponding to the plurality of information prompts comprises:

for each information prompt of the plurality of information prompts:

conduct a semantic search of the plurality of data sources;

conduct a lexical search of the plurality of data sources;

merge an output of the semantic search with an output of the lexical search to generate a merged ranking of data sources or data elements; and retrieve at least one data element from at least one data source based on the merged ranking.

28. The method of claim 27, wherein the at least one inference request comprises a plurality of inference requests, and wherein generating the at least one inference request based on the plurality of information prompts and the plurality of data elements comprises:

generating an inference request foreach information prompt of the plurality of information prompts, each inference request comprising the at least one data element retrieved based on the information prompt.

29. The method of claim 27, wherein conducting the lexical search comprises:

querying the plurality of data sources with a first search query based on a sequence of tokens in each information prompt, resulting in a first search output;

querying the plurality of data sources with a second search query based on individual tokens in each information prompt, resulting in a second search output; and combining the first search output and the second search output to form the output of the lexical search.

30. The method of claim 29, wherein combining the first search output and the second search output comprises:

generating a lexical score for each search result in the first search output and the second search output by:

generating a first relevance score based on a first weight and the first search output;

generating a second relevance score based on a second weight and the second search output;

generating a boost score based on the first search output; and combining the first relevance score, the second relevance score, and the boost score.

31. The method of claim 26, further comprising:

generating a second interactive graphical user interface based on at least one output received from processing the at least one inference request with the at least one machine-learning model, the second interactive graphical user interface comprising a plurality of responses to the plurality of information prompts and at least one feedback option configured to receive user input associated with at least one response of the plurality of responses; and updating at least one of the machine-learning model and a search algorithm configured to automatically retrieve the plurality of data elements based on the user input associated with the at least one response of the plurality of responses.

32. The method of claim 31, wherein the at least one feedback option comprises: a first feedback option configured to receive a selection of a predefined feedback response from at least two feedback responses, and a second feedback option configured to receive a freeform response from a user, wherein the structured document is generated based on at least one of a predefined feedback response and the freeform response.

33. The method of claim 32, further comprising:

automatically updating language translations of a response of the plurality of responses based on the freeform response.

34. The method of claim 31, wherein the second interactive graphical user interface comprises a plurality of source objects, each source object based on a data element of the plurality of data elements, each source object comprising at least a portion of the data element and at least one of the following: metadata associated with a data source including the data element, a classification of the data element, a classification of a data source including the data element, or any combination thereof.

35. The method of claim 26, further comprising:

receiving a plurality of responses to the plurality of information prompts based on processing the at least one inference request with the at least one machine-learning model;

determining a classification of at least one information prompt of the plurality of information prompts;

determining a validation source from a plurality of validation sources for the at least one information prompt based on the classification; and automatically routing a response to the at least one information prompt from the plurality of responses to the validation source.

36. The method of claim 26, further comprising:

displaying a second interactive graphical user interface to a validation source, the second interactive graphical user interface configured to receive a modification of the response;

receiving the modification from the validation source through the second interactive graphical user interface; and replacing the response with the modification in the structured response.

37. The method of claim 26, further comprising:

generating a final structured response based on receiving validation responses from all validation sources that received a routed response.

38. A system comprising:

at least one computing device configured to:

extract a plurality of information prompts from a document;

display, in an interactive graphical user interface, the plurality of information prompts and at least one selectable option configured to modify the plurality of information prompts;

verify the plurality of information prompts, wherein verifying the plurality of information prompts comprises:

determining a classification of at least one information prompt of the plurality of information prompts;

determining a verification source from a plurality of verification sources based on the classification;

automatically routing the at least one information prompt to the verification source; and receiving, from the verification source, a verification of the at least one information prompt;

in response to verifying the plurality of information prompts, automatically retrieve a plurality of data elements corresponding to the plurality of information prompts from a plurality of different data sources, each data element of the plurality of data elements corresponding to at least one information prompt of the plurality of information prompts;

generate at least one inference request based on the plurality of information prompts and the plurality of data elements; and generate a structured document based on processing the at least one inference request with at least one machine-learning model.

39. The system of claim 38, wherein automatically retrieving the plurality of data elements corresponding to the plurality of information prompts comprises:

for each information prompt of the plurality of information prompts:

conduct a semantic search of the plurality of data sources;

conduct a lexical search of the plurality of data sources;

merge an output of the semantic search with an output of the lexical search to generate a merged ranking of data sources or data elements; and retrieve at least one data element from at least one data source based on the merged ranking.

40. The system of claim 39, wherein the at least one inference request comprises a plurality of inference requests, and wherein generating the at least one inference request based on the plurality of information prompts and the plurality of data elements comprises:

generating an inference request foreach information prompt of the plurality of information prompts, each inference request comprising the at least one data element retrieved based on the information prompt.

41. The system of claim 39, wherein conducting the lexical search comprises:

querying the plurality of data sources with a first search query based on a sequence of tokens in each information prompt, resulting in a first search output;

querying the plurality of data sources with a second search query based on individual tokens in each information prompt, resulting in a second search output; and combining the first search output and the second search output to form the output of the lexical search.

42. The system of claim 41, wherein combining the first search output and the second search output comprises:

generating a lexical score for each search result in the first search output and the second search output by:

generating a first relevance score based on a first weight and the first search output;

generating a second relevance score based on a second weight and the second search output;

generating a boost score based on the first search output; and combining the first relevance score, the second relevance score, and the boost score.

43. The system of claim 38, the computing device further configured to:

generate a second interactive graphical user interface based on at least one output received from processing the at least one inference request with the at least one machine-learning model, the second interactive graphical user interface comprising a plurality of responses to the plurality of information prompts and at least one feedback option configured to receive user input associated with at least one response of the plurality of responses; and update at least one of the machine-learning model and a search algorithm configured to automatically retrieve the plurality of data elements based on the user input associated with the at least one response of the plurality of responses.

44. The system of claim 43, wherein the at least one feedback option comprises: a first feedback option configured to receive a selection of a predefined feedback response from at least two feedback responses, and a second feedback option configured to receive a freeform response from a user, wherein the structured document is generated based on at least one of a predefined feedback response and the freeform response.

45. The system of claim 44, the computing device further configured to: automatically update language translations of a response of the plurality of responses based on the freeform response.

46. The system of claim 43, wherein the second interactive graphical user interface comprises a plurality of source objects, each source object based on a data element of the plurality of data elements, each source object comprising at least a portion of the data element and at least one of the following: metadata associated with a data source including the data element, a classification of the data element, a classification of a data source including the data element, or any combination thereof.

47. The system of claim 38, the computing device further configured to:

receive a plurality of responses to the plurality of information prompts based on processing the at least one inference request with the at least one machine-learning model;

determine a classification of at least one information prompt of the plurality of information prompts;

determine a validation source from a plurality of validation sources for the at least one information prompt based on the classification; and automatically route a response to the at least one information prompt from the plurality of responses to the validation source.

48. The system of claim 38, the computing device further configured to:

display a second interactive graphical user interface to a validation source, the second interactive graphical user interface configured to receive a modification of the response;

receive the modification from the validation source through the second interactive graphical user interface; and replace the response with the modification in the structured response.

49. The system of claim 38, the computing device further configured to:

generate a final structured response based on receiving validation responses from all validation sources that received a routed response.

50. A computer program product comprising at least one non-transitory computer-readable medium including program instructions that, when executed by at least one processor, cause the at least one processor to:

extract a plurality of information prompts from a document;

display, in an interactive graphical user interface, the plurality of information prompts and at least one selectable option configured to modify the plurality of information prompts;

verify the plurality of information prompts, wherein verifying the plurality of information prompts comprises:

determining a classification of at least one information prompt of the plurality of information prompts;

determining a verification source from a plurality of verification sources based on the classification;

automatically routing the at least one information prompt to the verification source; and receiving, from the verification source, a verification of the at least one information prompt;

in response to verifying the plurality of information prompts, automatically retrieve a plurality of data elements corresponding to the plurality of information prompts from a plurality of different data sources, each data element of the plurality of data elements corresponding to at least one information prompt of the plurality of information prompts;

generate at least one inference request based on the plurality of information prompts and the plurality of data elements; and generate a structured document based on processing the at least one inference request with at least one machine-learning model.

* * * * *